US012281784B1

(12) United States Patent
Larsen, II et al.

(10) Patent No.: US 12,281,784 B1
(45) Date of Patent: Apr. 22, 2025

(54) DEVICE POWERED OVER COAXIAL CABLE VIA POWER ADAPTER

(71) Applicant: Channel Master, LLC, Chandler, AZ (US)

(72) Inventors: Anthony John Larsen, II, Chandler, AZ (US); Jose Ramon Bingochea, II, Chandler, AZ (US)

(73) Assignee: CHANNEL MASTER, LLC, Chandler, AZ (US)

( * ) Notice: Subject to any disclaimer, the term of this patent is extended or adjusted under 35 U.S.C. 154(b) by 0 days.

(21) Appl. No.: 18/631,168

(22) Filed: Apr. 10, 2024

(51) Int. Cl.

| | |
|---|---|
| ***F21V 23/06*** | (2006.01) |
| ***F21V 23/02*** | (2006.01) |
| ***F21V 23/04*** | (2006.01) |
| *F21Y 115/10* | (2016.01) |

(52) U.S. Cl.
CPC .............. *F21V 23/06* (2013.01); *F21V 23/02* (2013.01); *F21V 23/0435* (2013.01); *F21Y 2115/10* (2016.08)

(58) Field of Classification Search
CPC ...... F21V 23/06; F21V 23/02; F21V 23/0435; F21Y 2115/10
See application file for complete search history.

(56) References Cited

U.S. PATENT DOCUMENTS

2008/0166005 A1* 7/2008 Terlizzi .................. H04R 1/083 381/375
2009/0161348 A1* 6/2009 Spartano ............... F21V 21/084 362/373
2018/0013229 A1* 1/2018 Goulden ................ H01R 24/60
2018/0073707 A1* 3/2018 Sanders ................. H05B 45/30
2018/0266657 A1* 9/2018 Brandt .................. F21V 23/005
2020/0314317 A1* 10/2020 Motohashi ............. H04N 23/65

* cited by examiner

*Primary Examiner* — Evan P Dzierzynski
(74) *Attorney, Agent, or Firm* — Baker Botts L.L.P.

(57) ABSTRACT

In one embodiment, a system for powering a device, among other devices, includes a light device, a coaxial cable, and an adapter. The light device includes: a housing; a light sub-assembly situated within the housing, the light sub-assembly including at least one light-emitting diode (LED); a coaxial cable connector mounted to the housing; and a first circuitry disposed within the housing, the first circuitry being capable of receiving DC power from the coaxial cable connector and providing DC power to the light sub-assembly. The coaxial cable is coupled to the coaxial cable connector of the light device at a first end of the coaxial cable. The adapter is coupled to a second end of the coaxial cable opposite the first end. The adapter includes a second circuitry capable of converting AC power received from a power source to DC power output to the coaxial cable to power the light device.

20 Claims, 15 Drawing Sheets

DEVICE POWERED OVER COAXIAL CABLE VIA POWER ADAPTER

BACKGROUND

Various types of devices are used internally or externally in a residential, commercial, or other environment for different purposes. Such devices may include, for example and without limitation, security cameras, light devices, solar panels, audio or Bluetooth speakers, high definition (HD) televisions, aroma diffusers, Wi-Fi routers, network modems, etc. Some of these devices may be used or installed internally inside a residential or commercial space for indoor use. Other devices may be used or installed externally of the residential or commercial space for outdoor use. One particular example of such external outdoor devices are light devices. Light devices, including but not limited to flood lights, are often installed outdoors to provide exterior lighting around residential or commercial buildings and other structures. Such light devices are often mounted directly to a building structure.

The devices typically run on AC voltage and require pre-wired outlets to be located close to these devices where users want them to be installed. There can be challenges in installing, mounting, and/or powering these devices at particular locations. For example, it can be challenging to install, mount, and/or power devices where there is no provision of pre-wired AC power outlets. This may require need of an expert, such as an electrician, to come and install power outlets and provide appropriate power to the devices, which can be time consuming and costly. Also, it can be difficult to provide power to devices in a safe and efficient manner. This may be especially relevant to devices that need to be installed outside for external/outdoor use. For example, it may be challenging to retrofit the outside of a building structure (or other outdoor area) with new light devices.

SUMMARY OF THE INVENTION

One aspect of the invention is directed to a light device comprising: a housing; a light sub-assembly situated within the housing, the light sub-assembly comprising at least one light-emitting diode (LED); a coaxial cable connector mounted to the housing and having a first end and a second end, the first end being exterior to the housing and connectable to a coaxial cable, the second end being interior to the housing and opposite to the first end; at least one circuitry sub-assembly mounted within the housing and having circuitry mounted thereon, the circuitry capable of receiving DC power from the coaxial cable connector and providing DC power to the light sub-assembly; a first connection within the housing and electrically connecting the light sub-assembly to the at least one circuitry sub-assembly; and a second connection within the housing and electrically connecting the coaxial cable connector to the at least one circuitry sub-assembly.

Another aspect of the invention is directed to a system comprising: a light device comprising: a housing; a light sub-assembly situated within the housing, the light sub-assembly comprising at least one light-emitting diode (LED); a coaxial cable connector mounted to the housing; and circuitry disposed within the housing, the circuitry being capable of receiving DC power from the coaxial cable connector and providing DC power to the light sub-assembly; a coaxial cable coupled to the coaxial cable connector at a first end of the coaxial cable; and an adapter (also interchangeably herein referred to as a power adapter) coupled to a second end of the coaxial cable opposite the first end, wherein the adapter comprises circuitry capable of converting AC power received from a power source to DC power output to the coaxial cable.

Another aspect of the invention is directed to a system comprising: a device to be powered, the device comprising: a first housing, a first coaxial cable connector connected to the first housing, and a first circuitry disposed within the first housing, the first circuitry being capable of receiving DC power from the first coaxial connector and powering the device based on the DC power; a coaxial cable having a first end and a second end opposite the first end, the first end of the coaxial cable being connected or coupled to the first coaxial connector of the device and the second end of the coaxial cable being connected or coupled to a second coaxial connector of a power adapter (also interchangeably herein referred to as an adapter); and the power adapter for providing the DC power to the device over the coaxial cable, the power adapter comprising: a second housing, the second coaxial cable connector connected to the second housing and coupled to the second end of the coaxial cable, a power connector connected to an external power source to receive AC power, and a second circuitry disposed within the second housing, the second circuitry being capable of converting the AC power received from the external power source to the DC power, wherein the DC power is output, via the second coaxial connector, to the coaxial cable to power the device.

Another aspect of the invention is directed to a method comprising: installing or mounting a device to be powered; connecting a power adapter to an external power source; converting, using a circuitry of the power adapter, AC power from the external power source to DC power; providing the DC power from the power adapter to the device over a coaxial cable, wherein a first end of the coaxial cable is connected to a first coaxial cable connector of the device and a second end of the coaxial cable is connected to a second coaxial cable connector of the power adapter; and powering the device based on the DC power provided over the coaxial cable by the power adapter.

BRIEF DESCRIPTION OF THE DRAWINGS

Various embodiments are described in detail below with reference to the accompanying drawings, wherein like reference numerals represent like elements.

DESCRIPTION OF EMBODIMENTS

Figure 1A:
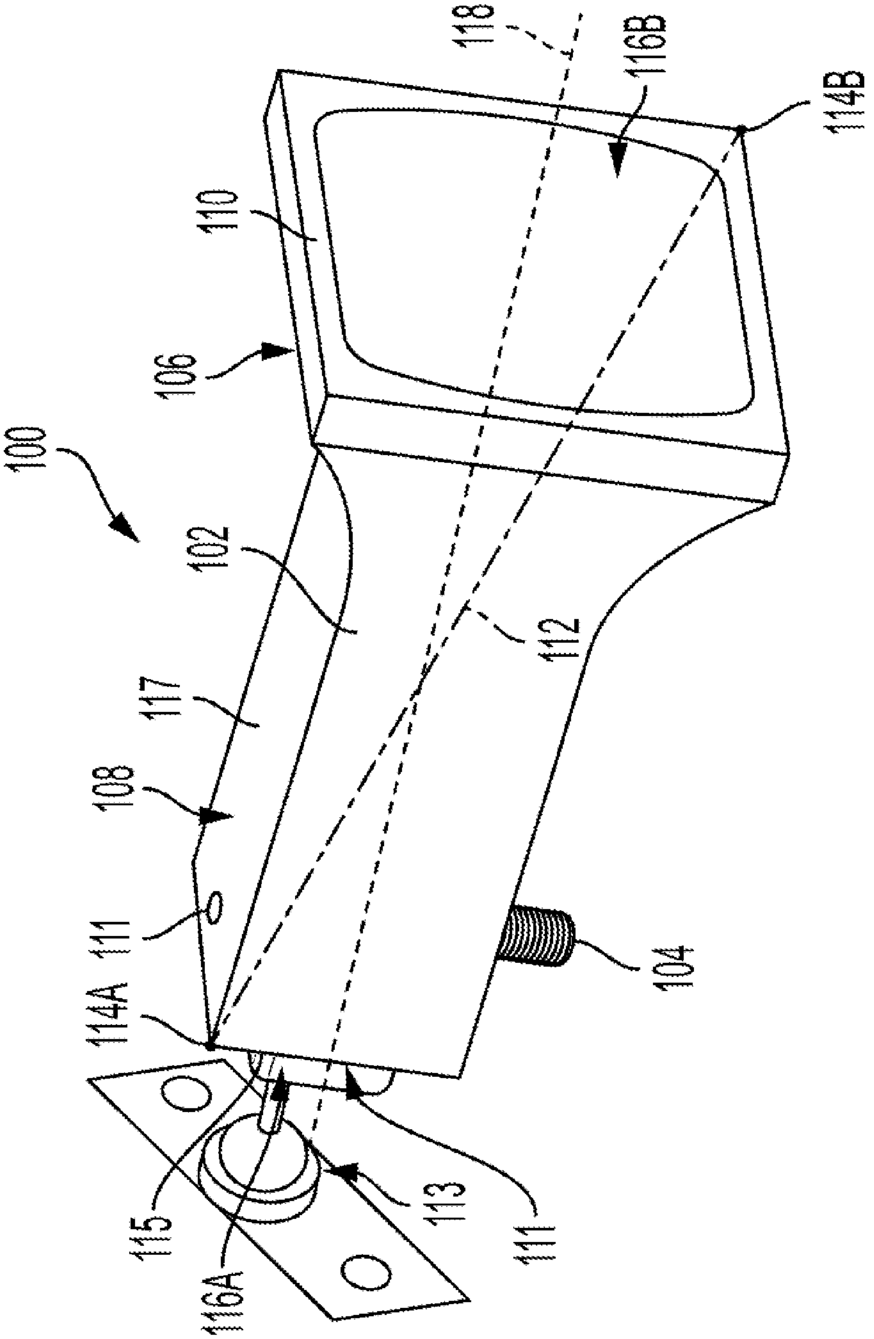
FIGS. 1A and 1B depict example light devices to be powered over coaxial cable.

Various types of devices may be used/installed inside or outside of a building for different purposes. For example, light devices, such as flood lights, are installed outdoors to provide exterior lighting around residential or commercial buildings and other structures. Fans and aroma diffusers may be used inside a room for air circulation and freshening, respectively. Security cameras may be installed inside or outside a building for tracking, security, and/or safety purposes. Some of these devices are often mounted directly to a building structure and run on AC voltage. It may be difficult to install new devices outdoors if there are no pre-wired AC power outlets available at locations where one wants to use, install, and/or mount these devices. A plug may be attached to a device for connecting the device to a distant power source. However, users sometimes make this connection by running an extension cord for long distances outdoors, which is not recommended for long-term usage and may cause a hazard. The less hazardous option is to have an electrician install an appropriate outdoor rated cable and/or add a new outlet to the building structure. Electrician licensing requirements may limit the number of individuals that are permitted to make such installations. This may increase cost and be time consuming to the user. In addition, some devices, such as, for example, conventional flood lights often include multiple (e.g., two, three, or more) lights pointed in different directions and connected to a mounting base, making them quite bulky.

In one or more exemplary embodiments of the present disclosure, the above-discussed difficulties may be overcome by use of a novel power adapter that is able to provide power over a coaxial cable to different devices. At a high level, the power adapter takes electrical power from an external power source, such as, for example, an alternating current (AC) source from a utility or power grid and transforms it to direct current (DC) power for use by a device. The device may be mounted to an outside of a building structure and may be located far away from the original power source (e.g., AC power source) where there may be no pre-wired power outlet available or installed. The power adapter provides transformed and/or converted DC power to the device over a coaxial cable in a safe and efficient manner. Additional details regarding how the power adapter is used to provide power to a device over a coaxial cable and the associated or individual components are shown and discussed later below in reference to at least FIGS. 5-7 and 10.

Some of the devices that may be powered over the coaxial cable via the power adapter discussed herein may include, for example and without limitation, IP security cameras with Wi-Fi and/or smart home features, miscellaneous home lighting devices (e.g., landscape lighting, recessed can lighting, wall mounted lighting, ceiling mounted lighting, etc.), coaxial to USB-C adapters for connecting DC powered products that already use USB-C type connectors for power, wall mounted and/or floor standing indoor and outdoor fans with coaxial power ports, aroma diffusers with coaxial power ports, solar panels with coaxial power ports, batteries with coaxial power ports, battery chargers/packs with coaxial power ports, indoor and/or outdoor Bluetooth/Wi-Fi speakers powered via coaxial power ports, high definition (HD) television powered via coaxial power port, security products or devices (e.g., motions sensors, door contacts, siren, glass break detectors, smoke detectors, carbon monoxide detectors, water leak detectors, etc.), Wi-Fi routers and/or access points, 5G devices, cellular repeaters and/or modems, flush valve sensors, electronic bathroom valves, irrigation controllers and electronic valves, and agriculture products (e.g., automatic feeders, electronic barriers, biometric sensors, etc.).

One of the devices that may be powered over coaxial cable via the power adapter is now discussed. The device is an improved external outdoor device, such as an improved light device, as shown and discussed in reference to at least FIGS. 1A-1B, 2A-2B, 3A-3D, 4A-4C, and 8A-8B. It should be noted that powering a device over coaxial cable via the power adapter (or simply an adapter) is not limited to the light device and a variety of other devices (e.g., as discussed above) are also possible and within the scope of the present disclosure. The improved light device discussed herein may be more readily installed outdoors, potentially without requiring the services of an electrician with specific licensing requirements. In particular, the improved light device is powered over coaxial cable via the novel power adapter discussed herein. The light device may be easily installed outdoors and powered over a coaxial cable via the power adapter by a user or homeowner. The light device is simple to install since it simply connects to a coaxial cable. One end of the coaxial cable is plugged into the light device, and the opposite end of the coaxial cable may be plugged into an adapter or other outlet. Connections between the light device, the coaxial cable, and the power adapter may be weatherproof, protecting from moisture and other potentially damaging conditions outside. Since coaxial cables deliver DC voltage, there is less potential hazard with installing a coaxial cable outdoors to connect the light device to a distant outlet, as there would be with an extension cord connected to AC voltage. The light device itself may be relatively small and lightweight, further increasing the ease of installation for a user. The disclosed light device and the power adapter, which provides DC voltage over coaxial cable, provides a robust, hardwired solution that enables consumers to easily install, mount, and/or power a device themselves without requiring the services of a specially-licensed electrician.

Figure 1B:
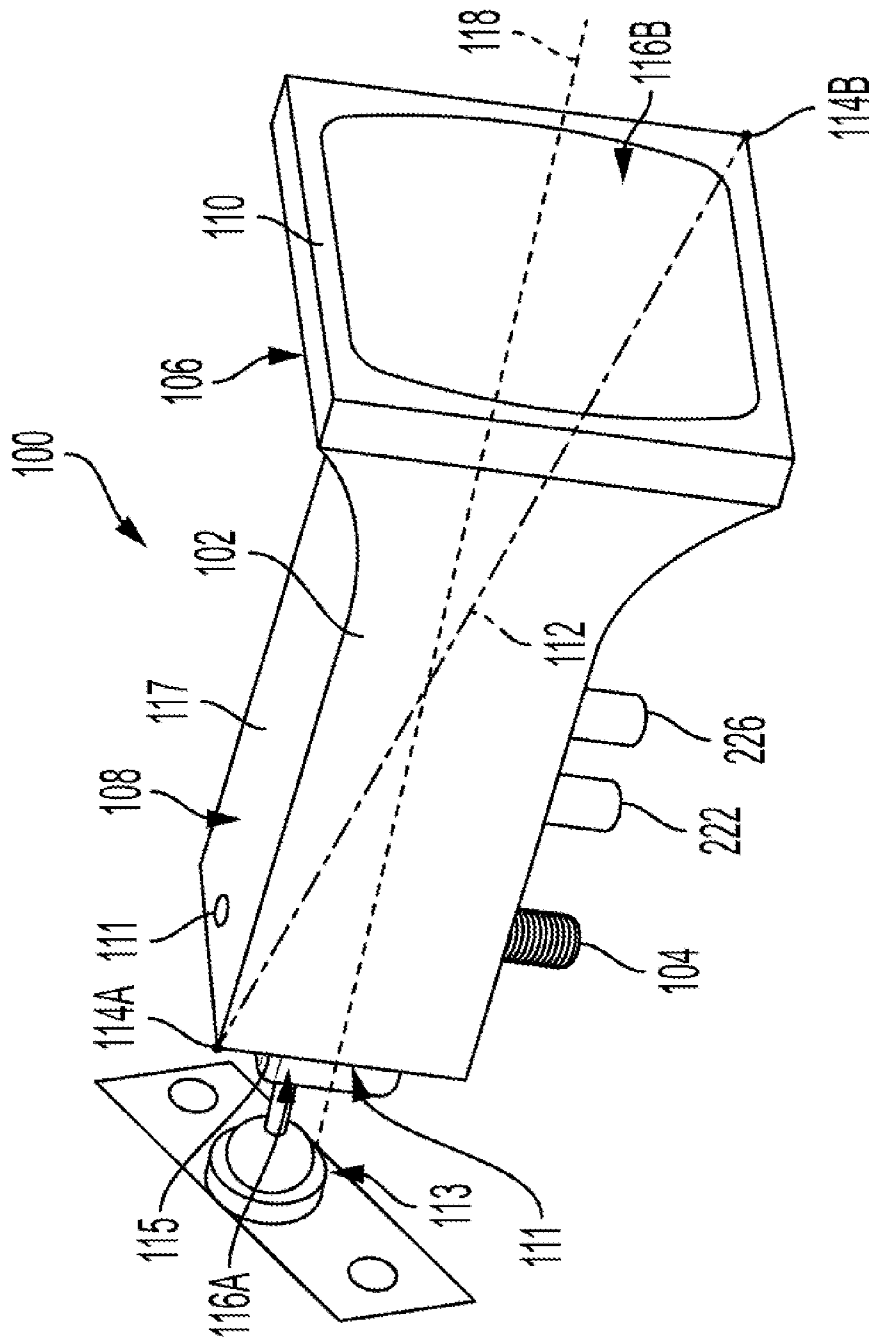

FIGS. 1A and 1B are perspective views of example light devices 100. Each light device 100 is configured to be powered over a coaxial cable via a power adapter, such as power adapter 504. When powered, the light device 100 may be configured to output light of up to certain light intensity, such as, for example, up to 2000 lumens. The light intensity may be controlled by way of a driver, such as driver 406 as shown and discussed in reference to at least FIGS. 4A-4C. The light device 100 may be a flood light, although other types of lights may be configured in a similar manner. In FIGS. 1A and 1B, the light device 100 is fully assembled and includes a housing 102 and a coaxial cable connector 104 mounted to the housing 102. Multiple sub-assemblies are located inside the housing 102, as will be discussed in detail with reference to FIGS. 2A and 2B.

The housing 102 may include a front portion 106 and a rear portion 108. The light device 100 may direct a beam of light out of the front portion 106 of the housing 102. To that end, the front portion 106 of the housing 102 may include a substantially transparent cover 110 and/or lens located therein. The cover 110 and/or lens may be selectively removable to provide access to internal components in the housing 102. The coaxial cable connector 104 may be mounted to the rear portion 108 of the housing 102.

The rear portion 108 of the housing 102 may include one or more mounting features 111 for mounting the light device 100 to a structure such as a building or to a mounting structure of a larger light assembly including the light device

100. In the illustrated embodiment, the mounting feature(s) 111 include one or more threaded apertures (e.g., ¼"-20 mounting holes) for attaching the light device 100 to a mounting system 113 such as, for example, an adjustable metal ball head mount with mounting screws. Other types of mounting systems may be used in other embodiments. For example, torx screws on a modular diffuser may be used to mount the light device 100 to a mounting system. In other embodiments, the housing 102 may include other types of mounting feature(s) 111 such as, for example, clamps, bolts, a projection or indentation used to provide a snap fit, landscape stakes, tripod mounts, articulating arms, magnets, suction cups, among others. In the illustrated embodiments of FIGS. 1A and 1B, the housing 102 includes two mounting features 111, one on a back surface 115 of the housing 102 and another on an upper surface 117 of the housing 102. This enables flexibility for installing the light device 100 at any desired orientation with respect to a building or mounting structure. Other numbers and/or arrangements of mounting features 111 may be included in the housing 102 in other embodiments.

The housing 102 may have an overall appearance of being substantially rectangular prism shaped, substantially truncated pyramid shaped, or substantially frustoconical shaped. In the embodiment of FIGS. 1A and 1B, the front portion 106 of the housing 102 has a substantially truncated pyramid shape. For example, the front portion 106 may have a cross-section that expands outwardly from one longitudinal end to the other in the direction of a longitudinal axis 118 of the housing 102. In the embodiments of FIGS. 1A and 1B, the rear portion 108 of the housing 102 has a substantially rectangular prism shape. For example, the rear portion 108 may have the same rectangular cross-section from one longitudinal end of the rear portion 108 to another portion of the rear portion 108 in the direction of the longitudinal axis 118 of the housing 102. In other embodiments, the entire housing 102 (including both the front portion 106 and the rear portion 108) may have a substantially truncated pyramid shape, a substantially frustoconical shape, or a substantially rectangular prism shape.

The housing 102 of the disclosed light device 100 may be smaller than conventional housings used for outdoor lighting. In particular, the housing 102 of the disclosed light device 100 may be smaller than conventional housings used for outdoor flood lights. As shown in FIGS. 1A and 1B, the housing 102 of the light device 100 may have a largest dimension 112 that is less than approximately 30 cm, particularly less than approximately 20 cm, or more particularly less than approximately 15 cm. This largest dimension 112 may extend from a first corner (or side) 114A at one longitudinal end 116A of the housing 102 to a second corner (or side) 114B at an opposite longitudinal end 116B of the housing 102. The first corner (or side) 114A is located opposite the second corner (or side) 114B when viewed from a direction parallel to the longitudinal axis 118 of the housing 102. This largest dimension 112 may be smaller than the largest dimension of the housing of a conventional light device (e.g., used for outdoor lighting such as outdoor flood lighting). As shown in FIGS. 1A and 1B, a cross-section of the housing 102 (taken in a plane perpendicular to the longitudinal axis 118), at its largest point along the length of the housing 102 (e.g., at the second longitudinal end 116B), may occupy an area less than or equal to approximately 60 $cm^2$, more particularly less than or equal to approximately 50 $cm^2$, or more particularly less than or equal to approximately 35 $cm^2$. This cross-section of the housing 102 at its largest point may be smaller than a corresponding cross-section of a conventional light device housing. The reduced size of the housing 102 compared to conventional light device housings may enable easier installation of the light device 100 by a user and improve the aesthetics of the building or other structure to which the light device 100 is mounted. For example, the small design of the housing 102 may accommodate a sleek under-the-eave mount or wall mount. The disclosed housing 102, even with relatively smaller dimensions, would continue to meet all National Electrical Manufacturers Association (NEMA) standards.

Figure 8A:
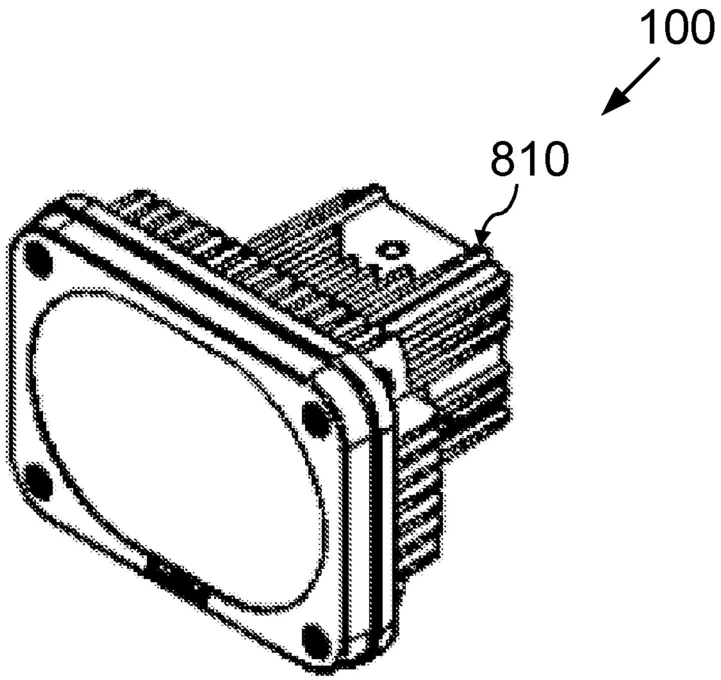
FIGS. 8A and 8B depict other examples of a light device with fins for heat diffusion.
Figure 8B:
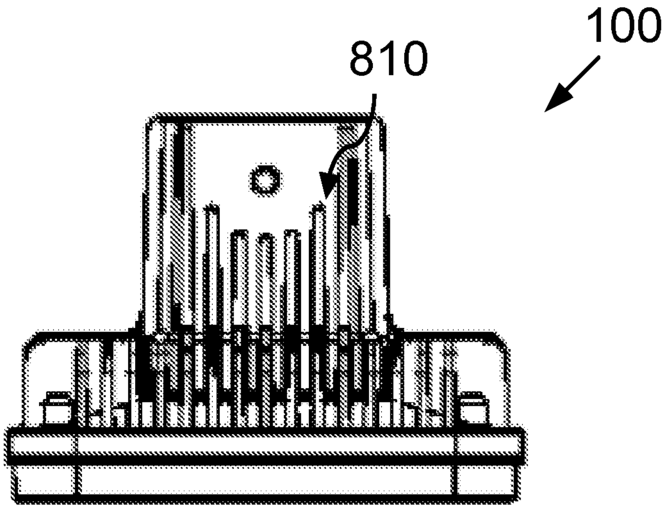

In some embodiments, the light device 100 may include fins for providing heat diffusion and/or dissipation. For example, as shown in FIGS. 8A and 8B, the light device 100 may include optional fins 810 for heat diffusion and/or dissipation. This provides cooling to the internal circuitry and one or more components of the light device 100. Furthermore, the fins 810 may also allow the light device 100 to operate in environments that may be too warm for the light device 100 to operate in.

Figure 2A:
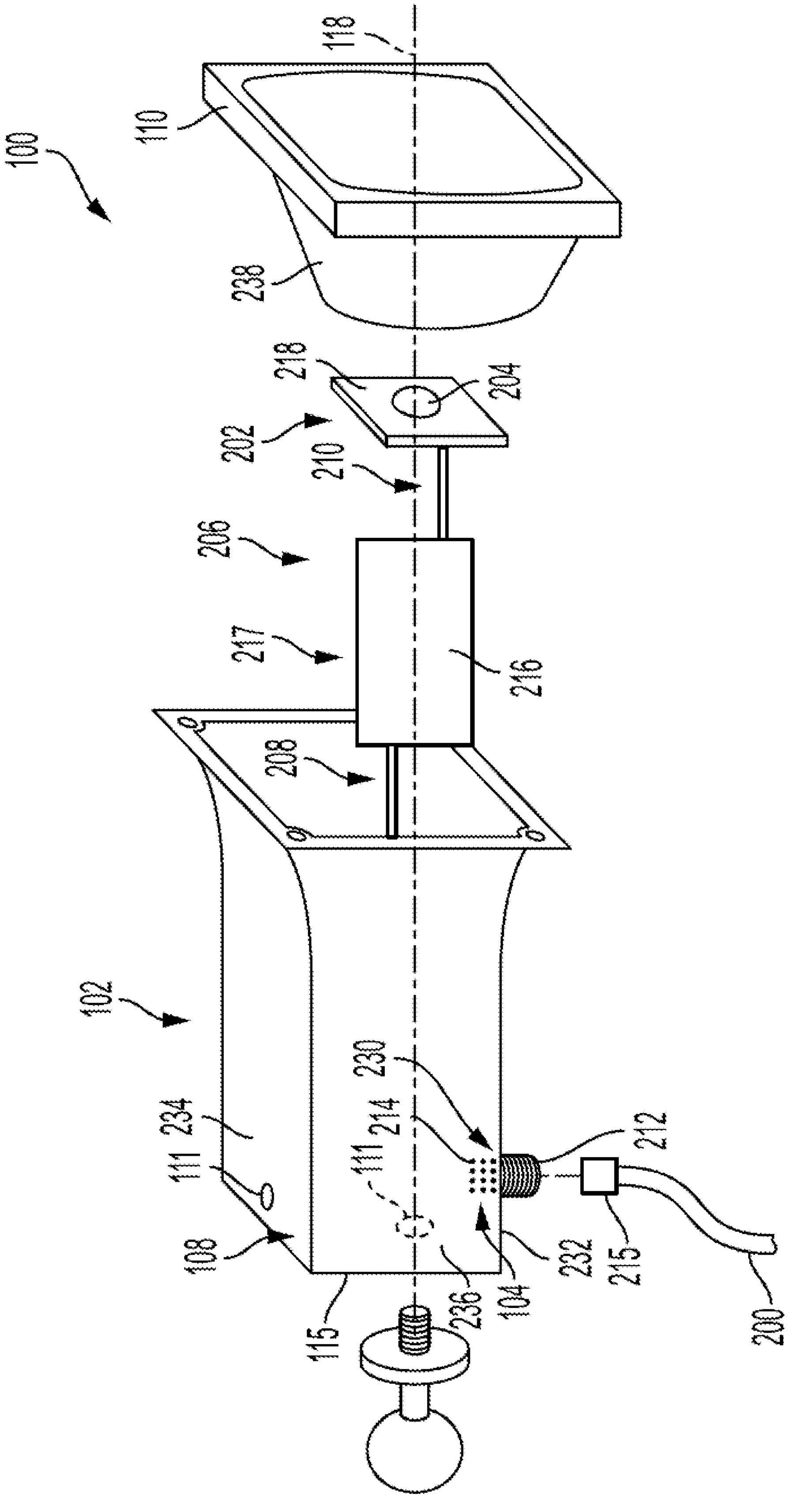
FIGS. 2A and 2B depict example light devices each in an exploded view.
Figure 2B:
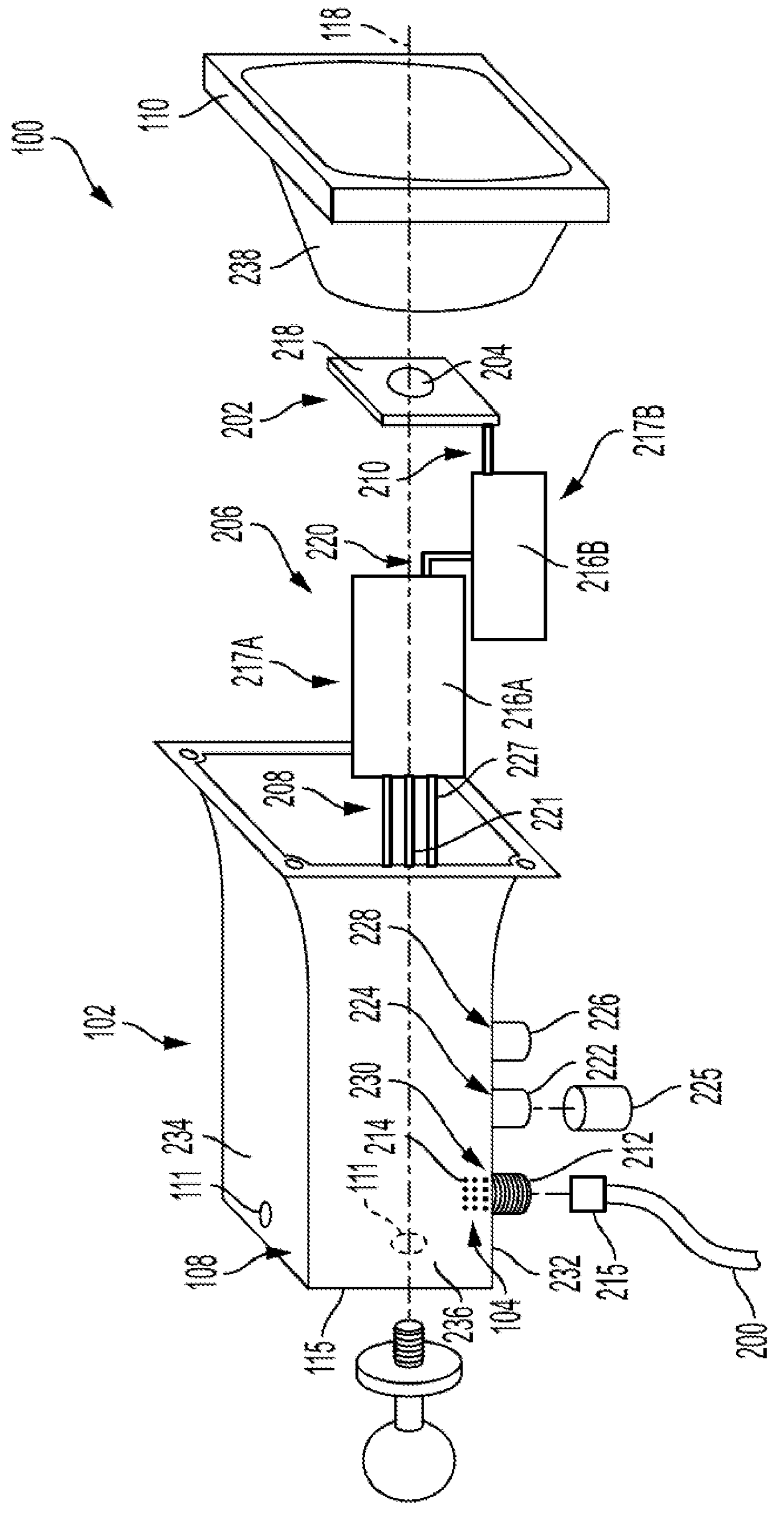

FIGS. 2A and 2B depict an example of the light device 100 in an exploded view. As discussed above, the light device 100 is configured to receive operating power from a coaxial cable 200. As illustrated, the light device 100 generally includes the housing 102, a light sub-assembly 202 comprising at least one light emitting diode (LED) 204, the coaxial cable connector 104, a circuitry sub-assembly 206, a first connection 208, and a second connection 210. When the light device 100 is fully assembled (as in FIGS. 1A and 1B), the light sub-assembly 202 is situated within the housing 102, the circuitry sub-assembly 206 is mounted within the housing 102, and the first and second connections 208 and 210 are also located within the housing 102. As illustrated, the light sub-assembly 202 may be an internal component located within the housing 102 that is relatively close to a front of the light device 100, and the circuitry sub-assembly 206 is located closer to the back of the light device 100 between the light sub-assembly 202 and the coaxial cable connector 104. When the light device 100 is fully assembled, the first connection 208 electrically connects the coaxial cable connector 104 to the circuitry sub-assembly 206. Likewise, when the light device 100 is fully assembled, the second connection 210 electrically connects the light sub-assembly 202 to the circuitry sub-assembly 206. The first and second connections 208 and 210 may be wired connections. As such, the first connection 208 may include a pair of wires connecting the coaxial cable connector 104 to the circuitry sub-assembly 206, and the second connection 210 may include a pair of wires connecting the circuitry sub-assembly 206 to the LED 204 on the light sub-assembly 202.

The coaxial cable connector 104 has a first end 212 and a second end 214. When the light device 100 is fully assembled, the coaxial cable connector 104 is mounted to the housing such that the first end 212 is exterior to the housing 102 and connectable to the coaxial cable 200 and the second end 214 is interior to the housing 102 opposite to the first end 212. The first end 212 of the coaxial cable connector 104 may include a female connection portion configured to interface with a male connection portion 215 of the coaxial cable 200. The coaxial cable connector 104 may be any type of cable connector with the first end 212 capable of connecting to a desired type of coaxial cable 200. For example, the coaxial cable connector 104 may be an F-type coaxial cable connector for interfacing with an F-type coaxial cable. In other embodiments, the coaxial cable connector 104 may be one of a BNC type, a TNC type, an N-series type, a UHF type, a SMA type, a QMA type, a FME type, a PAL type, a MC type, a MCX type, a MMCX type, a DIN type, a Mini-DIN type, a TS-9 type, or a NMO type connector for interfacing with one of the above listed types of coaxial cable. The second end 214 of the coaxial cable connector 104 may be coupled directly or indirectly to, or may form part of, the second connection 210 of the light device 100. When the light device 100 is fully assembled, the coaxial cable connector 104 may be situated in the rear portion 108 of the housing 102. The coaxial cable connector 104 may be built into the rear portion of the housing 102 or may extend through an opening 230 in the rear portion 108 of the housing 102.

The circuitry sub-assembly 206 has circuitry (e.g., 216 in FIGS. 2A and 216A/216B in FIG. 2B) mounted thereon, and this circuitry is capable of receiving DC power from the coaxial cable connector 104 and providing DC power to the light sub-assembly 202. The circuitry sub-assembly 206 may comprise one or more printed circuit boards (PCBs) (e.g., 217 in FIGS. 2A and 217A/217B in FIG. 2B) that are located within the housing 102. For example, as shown in FIG. 2A, the circuitry sub-assembly 206 may include a single PCB 217 having all the circuitry 216 for the light device 100. The circuitry 216 may act as a step-down converter and a light driver for regulating power output directly to the LED 204. In certain embodiments, the circuitry sub-assembly 206 and/or the circuitry 216 may also include a communication interface configured to receive wireless control signals from one or more external devices (e.g., over a network) to control operation of the light driver for the LED 204.

In another embodiment, as shown in FIG. 2B, the circuitry sub-assembly 206 may include a first PCB 217A and a second PCB 217B having different circuitry 216A and 216B, respectively. As illustrated in FIG. 2B, the light device 100 may include a third connection 220 (e.g., wired connection) between the two PCBs 217A and 217B. The circuitry 216A on the first PCB 217A may act as a photocell or main control circuit for controlling the light device 100, while the circuitry 216B on the second PCB 217B may act as a light driver for regulating power output directly to the LED 204. In other embodiments, the circuitry 216 may be spread amongst three or more PCBs in the light device 100.

Regardless of how the circuitry sub-assembly 206 is arranged, the circuitry (e.g., 216 in FIGS. 2A and 216A/216B in FIG. 2B) may be capable of controlling the DC power output to the light sub-assembly 202, thereby controlling an output of light from the LED(s) 204 of the light sub-assembly 202. In certain embodiments, the circuitry (e.g., 216 in FIGS. 2A and 216A/216B in FIG. 2B) may control the DC power output to the light sub-assembly 202 based on sensor signals received from other components of the light device 100, signals received via a wireless communication interface in the light device 100, and/or based on the presence of DC power provided by the coaxial cable connector 104.

When the light device 100 is fully assembled (as in FIGS. 1A and 1B), the circuitry sub-assembly 206 may be situated in the rear portion 108 of the housing 102. In certain embodiments, the circuitry sub-assembly 206 may be mounted to an interior of the rear portion 108 of the housing 102, for example, using screws or other attachment mechanisms. The circuitry sub-assembly 206 may be selectively removable from the housing 102 for repairing or replacing a portion or all of the circuitry sub-assembly 206. The circuitry 216 (or 216A/216B) on the circuitry sub-assembly 206 may be coupled directly or indirectly to, or may form part of, the first connection 208 of the light device 100. Similarly, the circuitry 216 (or 216A/216B) on the circuitry sub-assembly 206 may be coupled directly or indirectly to, or may form part of, the second connection 210 of the light device 100.

The light sub-assembly 202 includes one or more LEDs 204 used to output light from the light device 100. In the illustrated embodiment, the light sub-assembly 202 includes a single LED 204. The light sub-assembly 202 may be located toward the front of the light device 100 with the LED(s) 204 facing the front of the light device 100 so that light emitted from the LED(s) 204 is output from the light device 100 through the substantially transparent cover 110 and/or lens. The light sub-assembly 202 may include one or more LEDs 204 arranged on a base 218 that is placed within and/or mounted inside the housing 102. When the light device 100 is fully assembled (as in FIGS. 1A and 1B), the light sub-assembly 202 may be situated in the front portion 106 of the housing 102. The light sub-assembly 202 may be relatively compact compared to those used in conventional flood lights. For example, the light sub-assembly 202 may include a single LED 204, or a plurality of LEDs 204 arranged in a configuration occupying an area less than or equal to approximately 20 $cm^2$, more particularly less than or equal to approximately 10 $cm^2$, more particularly less than or equal to approximately 5 $cm^2$, or more particularly less than or equal to approximately 1 $cm^2$. The LED 204 or plurality of LEDs 204 may be arranged in a substantially planar configuration. The plurality of LEDs 204 may be arranged in a single cluster.

As shown in FIG. 2B, the light device 100 may further include a photosensor 222. The photosensor 222 may be an optical sensor capable of detecting light incident on a receiver portion of the optical sensor. The photosensor 222 may be connected to the circuitry 216A/216B (e.g., via a wired connection 221). The photosensor 222 and circuitry 216A/216B may be used to automatically turn on the light device 100 when it is dark outside and turn off the light device 100 when it is light outside. To that end, the photosensor 222 may output a signal to the circuitry 216A/216B, and the circuitry 216A/216B may control the at least one LED 204 (turning it on or off) based on the signal received from the photosensor 222. In some embodiments, the photosensor 222 may comprise a photocell having a semiconductor that changes resistance in response to photon energy received at the photosensor. As such, the photosensor 222 may enable current to flow through the wired connection 221 only when light energy hitting the photosensor 222 is above a threshold (light outside), and prevent current flow through the wired connection 221 when the light energy is below the threshold (dark outside). Based on whether current is flowing through the wired connection 221, the circuitry 216A/216B may control the LED(s) 204 to turn on when no current is flowing and to turn off when current is flowing. In another embodiment, the circuitry 216A/216B may control the LED(s) 204 to turn on when current is flowing through the wired connection 221 and to turn off when current is not flowing. It should be understood that other types of photosensors 222 may be used to signal the circuitry 216A/216B for controlling the at least one LED 204 based on the signal received from the photosensor 222. The photosensor 222 may be mounted to the housing 102 and have a portion of the photosensor 222 exposed to an exterior of the housing 102 (e.g., via an opening 224 in the housing 102). In some embodiments, the light device 100 may include a removable cover 225 that can be removably placed over the photosensor 222. The cover 225 may be dark in color so that it mimics darkness on the photosensor 222. When the cover 225 is placed over the photosensor 222, the signal from the photosensor 222 may indicate that it is dark outside and the circuitry 216A/216B may control the LED(s) 204 to maintain the LED(s) 204 on, regardless of whether it is light or dark outside.

As shown in FIG. 2B, the light device 100 may further include a motion sensor 226. The motion sensor may be an infrared, radar, ultrasonic, or any other sensor capable of detecting motion. In some embodiments, the motion sensor 226 may be a passive sensor (e.g., passive infrared (PIR) sensor) having two or more receivers, the sensor being capable of detecting a difference in electromagnetic waves received at the different receivers over time (thus indicating motion). In other embodiments, the motion sensor 226 may be an active sensor having a transmitter and receiver, the sensor being capable of detecting a change in electromagnetic or ultrasonic waves incident on the receiver in response to electromagnetic or ultrasonic waves output from the transmitter (thus indicating motion). The motion sensor 226 may be connected to the circuitry 216A/216B (e.g., via a wired connection 227). The motion sensor 226 may be used to detect movement near the light device 100 so that the light device 100 can automatically turn on in response to the nearby movement. To that end, the motion sensor 226 may output a signal to the circuitry 216A/216B indicating a change in the waves incident on the receiver(s) of the photosensor 222 (indicating movement), and the circuitry 216A/216B may turn on the LED(s) 204 of the light sub-assembly 202 in response to the signal from the motion sensor 226. As such, the circuitry 216A/216B may be capable of controlling the at least one LED 204 based on the signal received from the motion sensor 226. The motion sensor 226 may be mounted to the housing 102 and have a portion of the motion sensor 226 exposed to an exterior of the housing 102 (e.g., via an opening 228 in the housing 102). Although not shown, in some embodiments, the light device 100 may include a removable cover (similar to cover 225) that can be removably placed over the motion sensor 226. Such a cover may operate to prevent the motion sensor 226 from detecting any motion.

It should be noted that certain embodiments of the light device 100 may have only the photosensor 222 and no motion sensor. In other embodiments, the light device 100 may have only the motion sensor 226 and no photosensor. In still other embodiments, as shown in FIGS. 1A and 2A, the light device 100 may have no sensors at all (no photosensor and no motion sensor) and just use the light driver (e.g., circuitry 216B) to deliver power to the light sub-assembly 202 at all times that DC power is being provided through the coaxial cable 200.

The housing 102 may comprise a metal cast housing. However, other types of materials and/or techniques may be used to form the housing 102. For example, the housing 102 may be made from diecast aluminum. The housing 102 may be weatherproof (e.g., having an IP65 waterproof rating). The housing 102 may be constructed with one or more openings formed through the housing 102. As shown in FIGS. 2B-3C, for example, the housing 102 may include a first opening 224 and a second opening 228 for holding sensors. In other embodiments, only a single opening (e.g., opening 224 or opening 228) may be included in the housing 102. In still other embodiments, one single opening may encompass the area of both openings 224 and 228 of FIGS. 2B-3C. In further embodiments, no openings 224 and 228 for sensors may be provided in the housing 102. As shown in FIGS. 2A and 2B, the housing 102 may include an opening 230 through which the coaxial cable connector 104 may pass.

As discussed above, the housing 102 may have a rear portion 108 with a substantially rectangular prism shape. For example, as visible in FIGS. 2A-3D, the substantially rectangular prism shape of the rear portion 108 may include the back surface 115, a first face 232, a second face 234, and a third face 236. The first face 232 may be located opposite the second face 234, and the third face 236 may connect the first face 232 and the second face 234. The third face 236 may be substantially perpendicular to the first face 232 and substantially perpendicular to the second face 234, as shown. The first face 232, second face 234, and third face 236 may each be substantially perpendicular to the back surface 115.

Certain openings may be arranged at the rear portion 108 of the housing 102 in various ways. For example, as shown in FIG. 2A, the coaxial cable connector 104 may pass through the first face 232 (e.g., through the opening 230), and the back surface 115 and the second face 234 each have a mounting feature 111 formed therein.

As another example, shown in FIG. 2B, the coaxial cable connector 104 may pass through the first face 232 (e.g., through the opening 230), and the first face 232 of the rear portion 108 may also have one or more other openings 224/228. The photosensor 222 and the motion sensor 226 may be exposed to an exterior of the housing 102 via the at least one opening 224/228 of the first face 232. As illustrated, the back surface 115 and the second face 234 each have a mounting feature 111 formed therein.

Figure 3A:
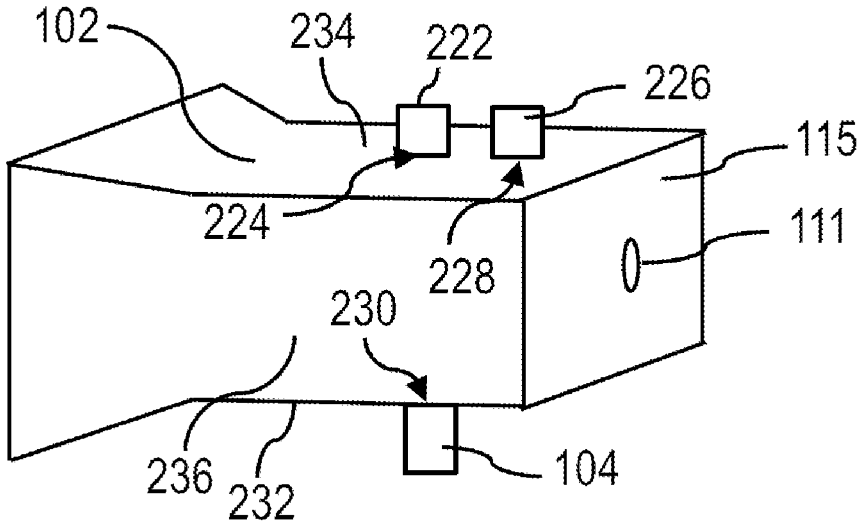
FIGS. 3A-3D depict other examples of light devices to be powered over coaxial cable.

Any other desired arrangement of the openings 224, 228, and/or 230 and one or more mounting features 111 may be used in other embodiments of the light device 100. For example, as shown in FIG. 3A, the coaxial cable connector 104 may pass through the first face 232 (e.g., through the opening 230), and the second face 234 of the rear portion 108 may have one or more other openings 224/228. The photosensor 222 and the motion sensor 226 may be exposed to an exterior of the housing 102 via the at least one opening 224/228 of the second face 234. As illustrated, the back surface 115 has a mounting feature 111 formed therein.

Figure 3B:
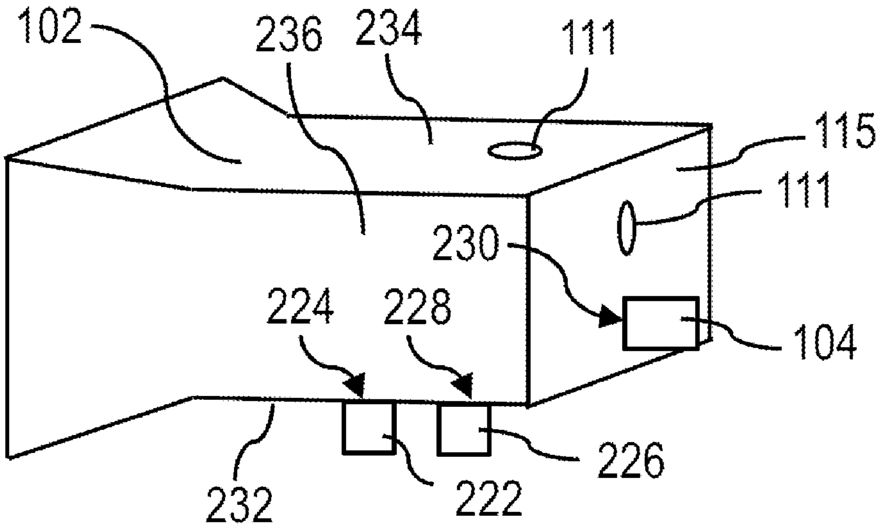

In another embodiment, shown in FIG. 3B, the coaxial cable connector 104 may pass through the back surface 115 (e.g., through the opening 230), and the first face 232 of the rear portion 108 may have one or more other openings 224/228. The photosensor 222 and the motion sensor 226 may be exposed to an exterior of the housing 102 via the at least one opening 224/228 of the first face 232. As illustrated, the back surface 115 and the second face 234 may each have a mounting feature 111 formed therein.

Figure 3C:
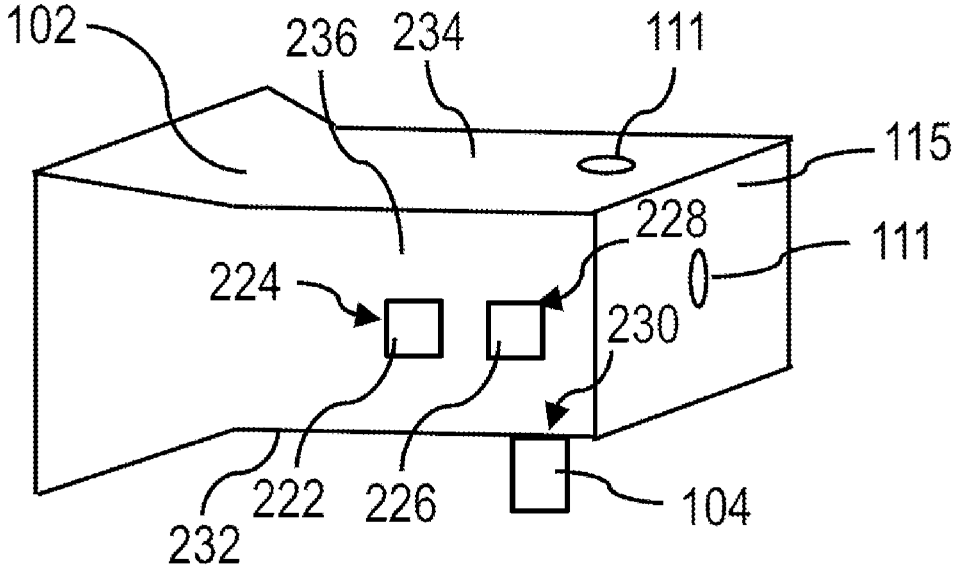

In still another embodiment, shown in FIG. 3C, the coaxial cable connector 104 may pass through the first face 232 (e.g., through the opening 230), and the third face 236 of the rear portion 108 may have one or more other openings 224/228. The photosensor 222 and the motion sensor 226 may be exposed to an exterior of the housing 102 via the at least one opening 224/228 of the third face 236. As illustrated, the back surface 115 and the second face 234 may each have a mounting feature 111 formed therein. Any other desired combination of mounting features 111 and openings 224/228/230 may be arranged among the different surfaces and faces at the rear portion 108 of the housing 102 in other embodiments.

Figure 3D:
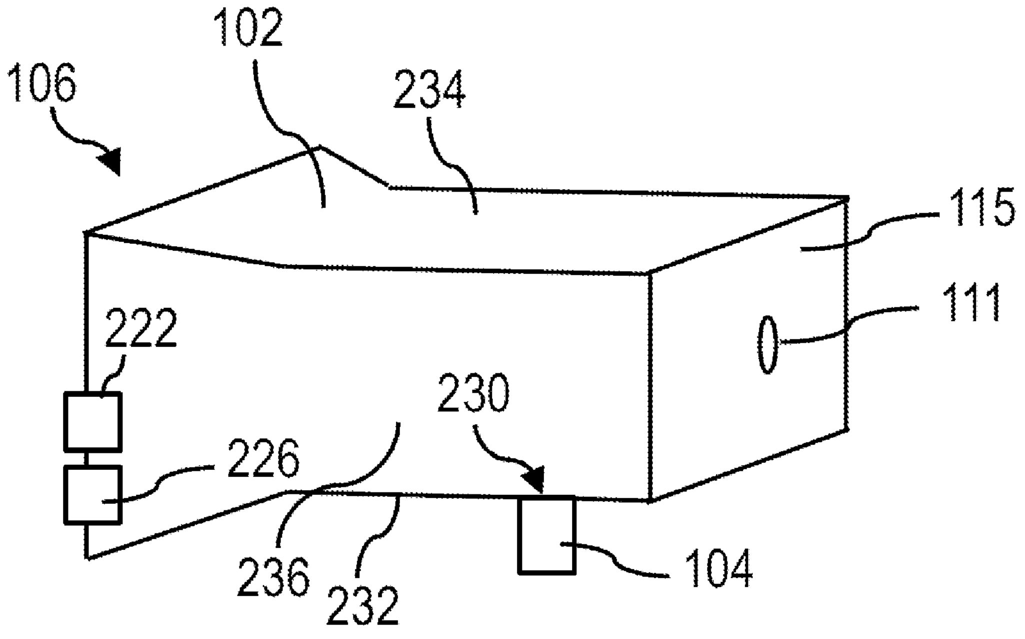

In still another embodiment, shown in FIG. 3D, the photosensor 222 and motion sensor 226 may be exposed to an exterior of the housing 102 proximate the front portion 106 of the housing 102 (e.g., adjacent to the cover and/or lens 110). In other embodiments, the photosensor 222 and/or motion sensor 226 may be disposed inside the cover 110 and visually exposed to the outside through the lens of the cover 110. As illustrated, the coaxial cable connector 104 may pass through the first face 232 (e.g., through the opening 230), and the back surface 115 and the second face 234 may each have a mounting feature 111 formed therein. Any other desired combination of mounting features 111 and openings (e.g., 230) may be arranged among the different surfaces and faces at the rear portion 108 of the housing 102 in other embodiments. In addition, the photosensor 222 and/or motion sensor 226 may be located at different portions along (or even in front of) the front portion 106 of the housing 102 in other embodiments.

In addition, referring back to FIGS. 2A and 2B, other components may be located within the housing 102 of the light device 100. For example, the light device 100 may include a reflector 238 configured to be located within the housing 102. When the light device 100 is fully assembled (as shown in FIGS. 1A and 1B), the reflector 238 may be situated within the front portion 106 of the housing 102 between the light sub-assembly 202 and the cover 110 and/or lens. The reflector 238 is configured to direct the light output from the one or more LEDs 204 of the light sub-assembly 202 in a particular beam shape or texture as the light exits the light device 100. As illustrated, the reflector 238 may be integral with the cover 110 and/or lens. In other embodiments, the reflector 238 may be separate from the cover 110 and/or lens. The reflector 238 may be a separate component from the housing 102, as shown. In other embodiments, the reflector 238 may be integral with an interior of the front portion 106 of the housing 102.

Figure 4A:
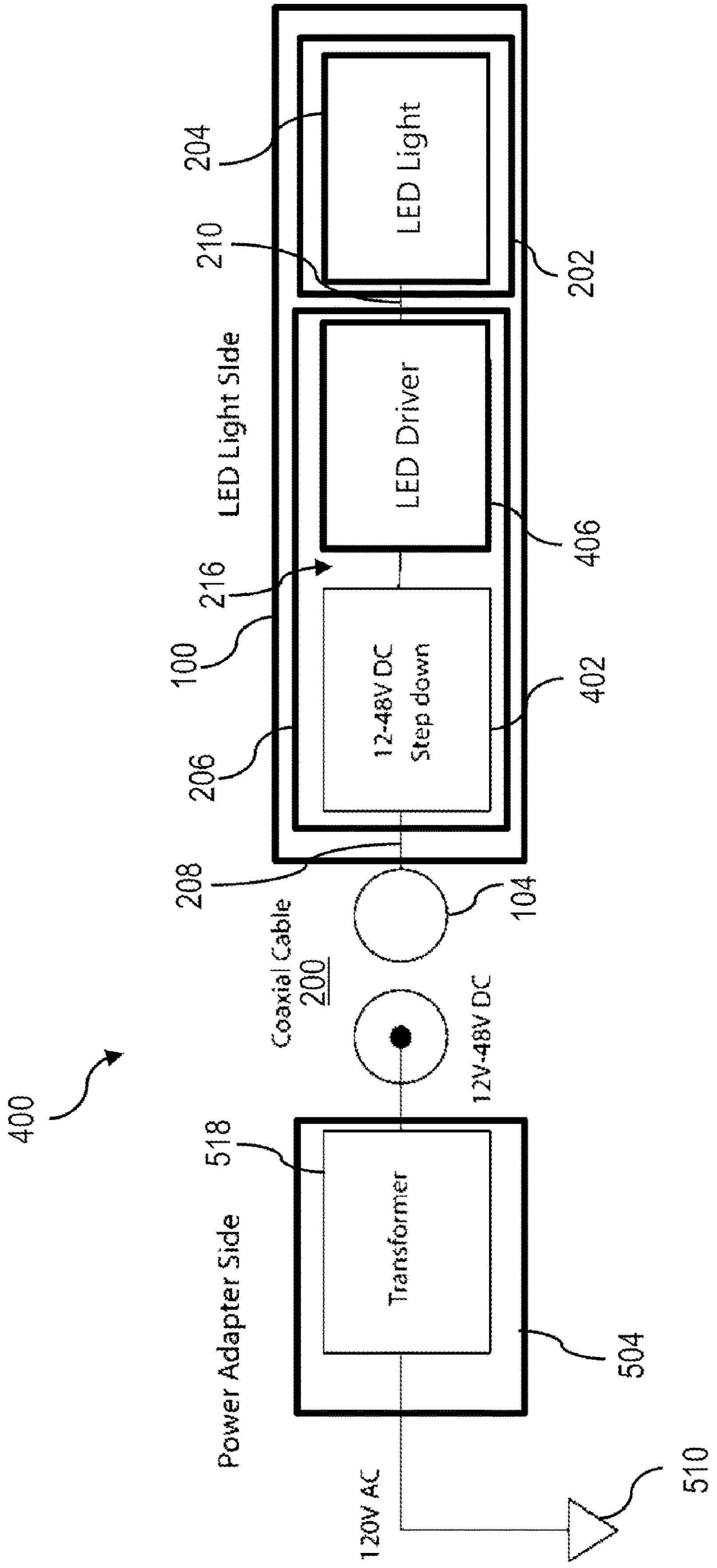
FIGS. 4A-4C depict electrical components within example systems having different light devices.
Figure 4B:
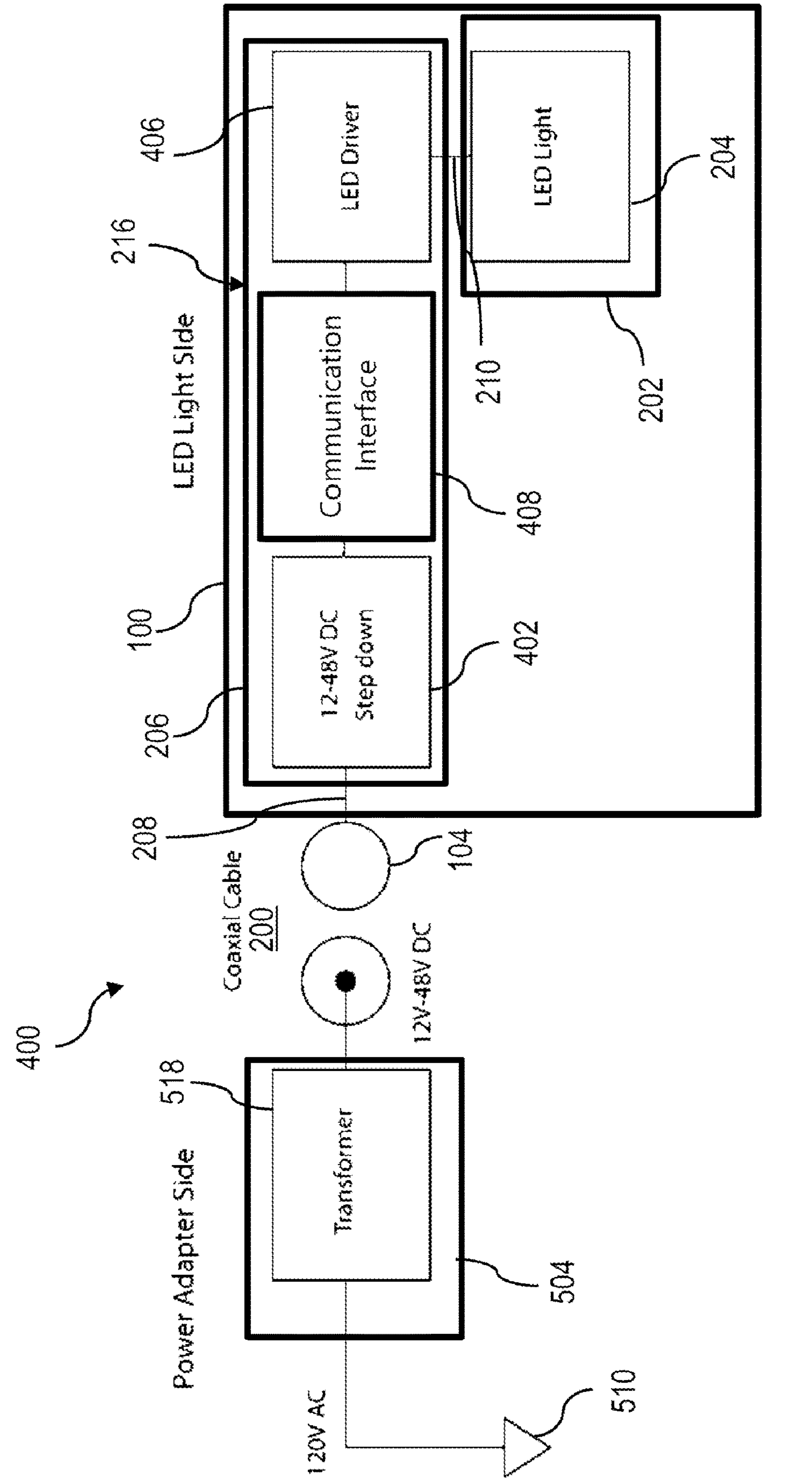
Figure 4C:
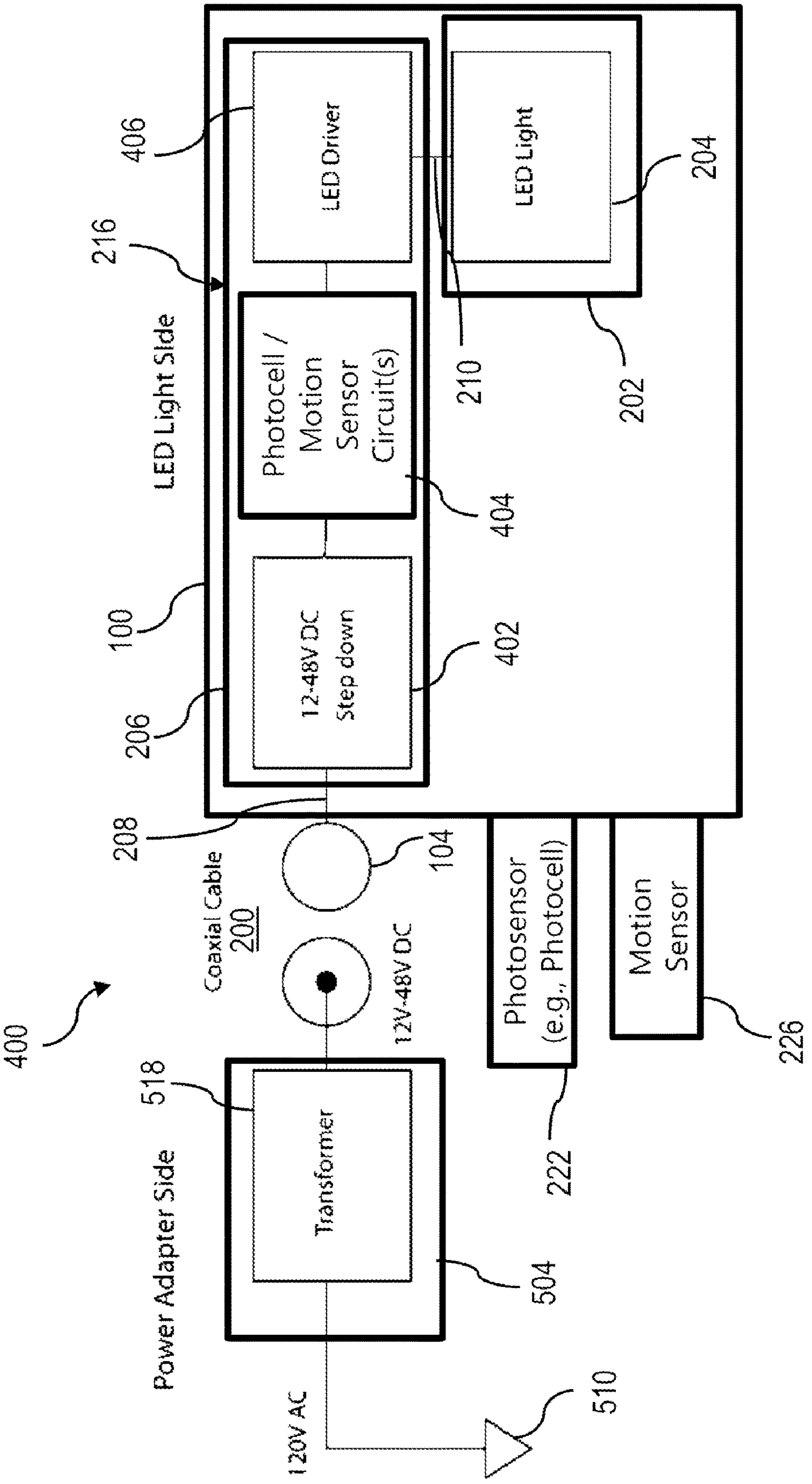

FIGS. 4A-4C depict electrical components within example systems 400 including the light devices 100 of FIGS. 1A and 1B. The systems 400 also include the coaxial cable 200 and a power adapter 504 ("adapter"). As discussed elsewhere herein, instead of the light device 100, the systems 400, including the coaxial cable 200 and the power adapter 504, are applicable to other devices, such as, for example, an outdoor fan, an aroma diffuser, a monitored gate, plumbing components (e.g., automatic faucets, bidets), etc. In other words, the power adapter 504 of the system 400 may be used to power another device (instead of light device 100) over the coaxial cable 200. The system 400 is now discussed with respect to the light device 100. On the LED light side, the electrical components may be located within the housing (e.g., 102 of FIGS. 1A and 1B) of the light device 100. As described above, the light device 100 includes the coaxial cable connector 104, the light sub-assembly 202, the circuitry sub-assembly 206, the first connection 208, and the second connection 210. As shown in FIG. 4C, the system 400 may optionally include the photosensor 222 and/or the motion sensor 226.

In FIGS. 4A-4C, the light sub-assembly 202 is electrically coupled to the circuitry sub-assembly 206 via the first connection 208, and the circuitry sub-assembly 206 is electrically coupled to the coaxial cable connector 104 via the second connection 210. The light sub-assembly 202 is only powered by DC power received through the coaxial cable connector 104. In addition, the circuitry sub-assembly 206 may be only powered by the DC power received through the coaxial cable connector 104.

As shown in FIG. 4A, the circuitry 216 of the circuitry sub-assembly 206 may include a DC step down converter 402 and an LED driver circuit 406. Other components may be present in the circuitry sub-assembly 206 in other embodiments. For example, as shown in FIG. 4B, the circuitry sub-assembly 206 may include a communication interface 408 between the DC step down converter 402 and the LED driver circuit 406. The communication interface 408 may be a wireless communication interface configured to receive wireless signals from another device across a network so as to control operation of the LED driver 406 and the LED light 204. As another example, in embodiments where a photosensor 222 and/or motion sensor 226 are included (e.g., FIG. 4C), the circuitry 216 of the circuitry sub-assembly 206 also includes photosensor and/or motion sensor circuit(s) 404 between the DC step down converter 402 and the LED driver circuit 406. As another example, the circuitry sub-assembly 206 of the light device 100 may include a buck converter (not shown) to adjust a voltage that is provided to the light device 100. For example, the buck converter may convert a higher input voltage to a lower output voltage. As yet another example, the circuitry sub-assembly 206 of the light device 100 may include a block upconverter (BUC) (not shown) to convert a band of frequencies from a lower frequency to a higher frequency if in case the provided voltage to the light device 100 is too low or drops below a certain threshold.

In an example, as shown in FIGS. 4A-4C, there is no transformer present in the housing (e.g., 102 of FIGS. 1A and 1B) of the light device 100. This may reduce the overall complexity of the light device 100 as well as the size of the housing for the light device 100, making the light device 100 easy for a user to install.

As shown, the adapter 504 may include a step-down transformer 518 to reduce the AC voltage within the adapter from a higher AC voltage output from a power source 510 to the adapter 504. As discussed in detail below, the adapter 504 also includes an AC/DC converter.

Figure 5:
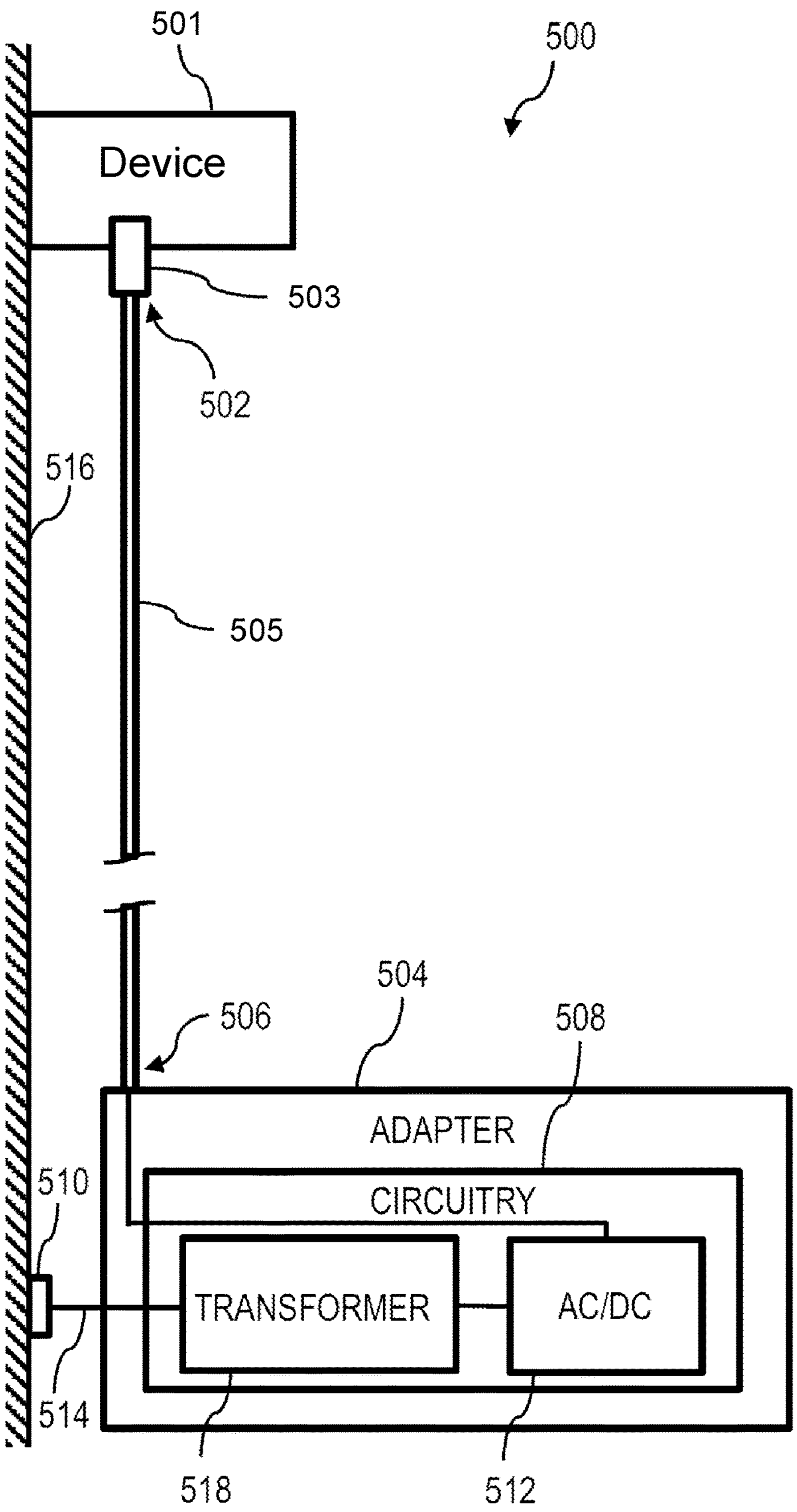
FIG. 5 depicts an example of a system including a device powered over coaxial cable via a power adapter.

FIG. 5 depicts an example of a system 500 including a device 501 that may be powered over a coaxial cable 505 via a power adapter 504. The device 501 may be one of: an IP security camera with Wi-Fi and/or smart home features, a miscellaneous home lighting device (e.g., landscape lighting, recessed can lighting, wall mounted lighting, ceiling mounted lighting, etc.), a coaxial to USB-C adapter for connecting DC powered products that already use USB-C type connectors for power, a wall mounted or floor standing indoor/outdoor fan with coaxial power port, an aroma diffuser with coaxial power port, a solar panel with coaxial power port, batteries with coaxial power ports, a battery charger/pack with coaxial power port, an indoor or outdoor Bluetooth/Wi-Fi speaker powered via coaxial power port, a HD television powered via coaxial power port, a security product or device (e.g., motions sensor, door contact, siren, glass break detector, smoke detector, carbon monoxide detector, water leak detector, etc.), a Wi-Fi router or access point, a 5G device, a cellular repeater or a modem, a flush valve sensor, an electronic bathroom valve, an irrigation controller, and an agriculture product (e.g., automatic feeder, electronic barrier, biometric sensor, etc.)

In particular embodiments, the device 501 is an external outdoor device, such as the light device 100, as shown and discussed in reference to FIGS. 1A-1B, 2A-2B, 3A-3D, 4A-4C, and 8A-8B. As described above, the light device 100 may include the coaxial cable connector 104, light sub-assembly (e.g., 202 of FIGS. 1A-4C), circuitry sub-assembly (e.g., 206 of FIGS. 1A-4C), first connection (e.g., 208 of FIGS. 1A-4C), second connection (e.g., 210 of FIGS. 1A-4C), and, optionally, photosensor (e.g., 222 of FIGS. 1B, 2B-3D, and 4C) and/or motion sensor (e.g., 226 of FIGS. 1B, 2B-3D, and 4C). As shown in FIG. 5, the system 500 includes the coaxial cable 505 (e.g., coaxial cable 200)

coupled to a coaxial cable connector 503 (e.g., the coaxial cable connector 104) of the device 501 (e.g., light device 100) at a first end 502 of the coaxial cable 505.

Figure 9:
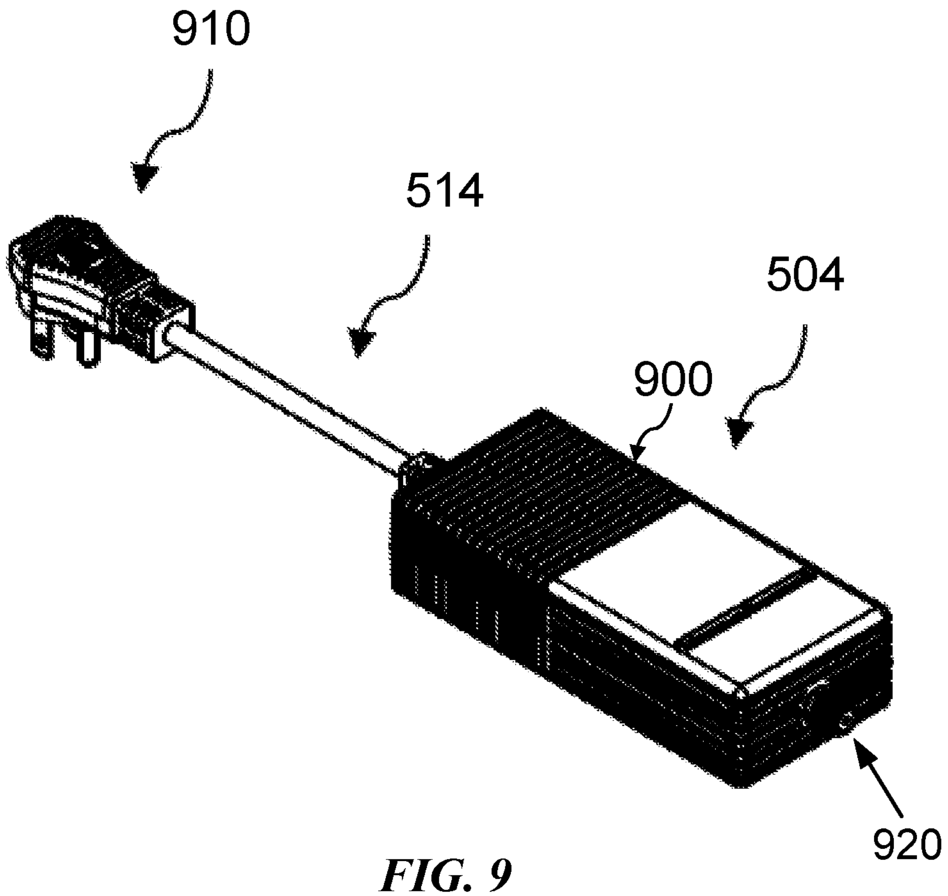
FIG. 9 depicts an example power adapter for providing power to a device over coaxial cable.

The system 500 also includes an adapter 504 coupled to a second end 506 of the coaxial cable 505 opposite the first end 502. In certain embodiments, the adapter 504 may include a coaxial cable connector (e.g., coaxial cable connector 920 as shown in FIG. 9) that is connected or coupled to the second end 506 of the coaxial cable 505. The adapter 504 may be weatherproof (e.g., having an IP65 waterproof rating). The adapter 504 includes circuitry 508 capable of converting AC power received from a power source 510 (e.g., grid power) to DC power output to the coaxial cable 505. To that end, the circuitry 508 may include an AC/DC converter 512. The adapter 504 may include an AC power connector 514 configured to be connected to the AC power source 510. The AC power connector 514 may be a pigtail outdoor connector that is weatherproof. The coaxial cable 505 may have weatherproof connections (e.g., via weather seal boots designed for coaxial cable) at its first end 502 and second end 506 for enhanced outdoor protection. The coaxial cable 505 may be at least approximately 750 cm, more particularly at least approximately 1,000 cm, or more particularly at least approximately 1,500 cm in length. This enables easy installation and flexible placement of the device 501, such as light device 100. For example, a user may install the light device 100 anywhere on the exterior of the building or other structure and power the light device 100 from a far distance away from a standard electrical outlet. The device 501 (e.g., light device 100) and adapter 504 may support optional longer lengths of the coaxial cable 505 (e.g., coaxial cable 200), for example, up to approximately 4,572 cm, or more. The AC power connector 514 may be relatively short in length compared to the coaxial cable 505. For example, the AC power connector 514 may be less than approximately 40 cm, or more particularly less than approximately 20 cm in length. As such, the adapter 504 may be located proximate the AC power source 510 (e.g., located along a side of a building structure 516 to which the 501 is mounted).

As shown in FIG. 5, the circuitry 508 in the adapter 504 may further include a transformer 518 capable of stepping down voltage of the AC power received from the power source 510. That way, the adapter 504 can output DC power at a lower voltage (e.g., 12V-48V DC) than the AC voltage (e.g., 120V AC) available from the power source 510 (e.g., grid). This lower voltage is appropriate for operating the device 501, such as the light device 100 in particular. Since the transformer 518 is located in the adapter 504 and not in a housing of the device 501 (e.g., housing 102 of the light device 100), the device 501 is relatively small and easy to mount compared to existing outdoor mounted devices. In addition, locating the transformer 518 in the adapter 504 makes the transformer more easily accessible should repairs or a replacement transformer be needed. The adapter 504 may further include an integrated on/off switch and a small power indicator light.

Figure 6:
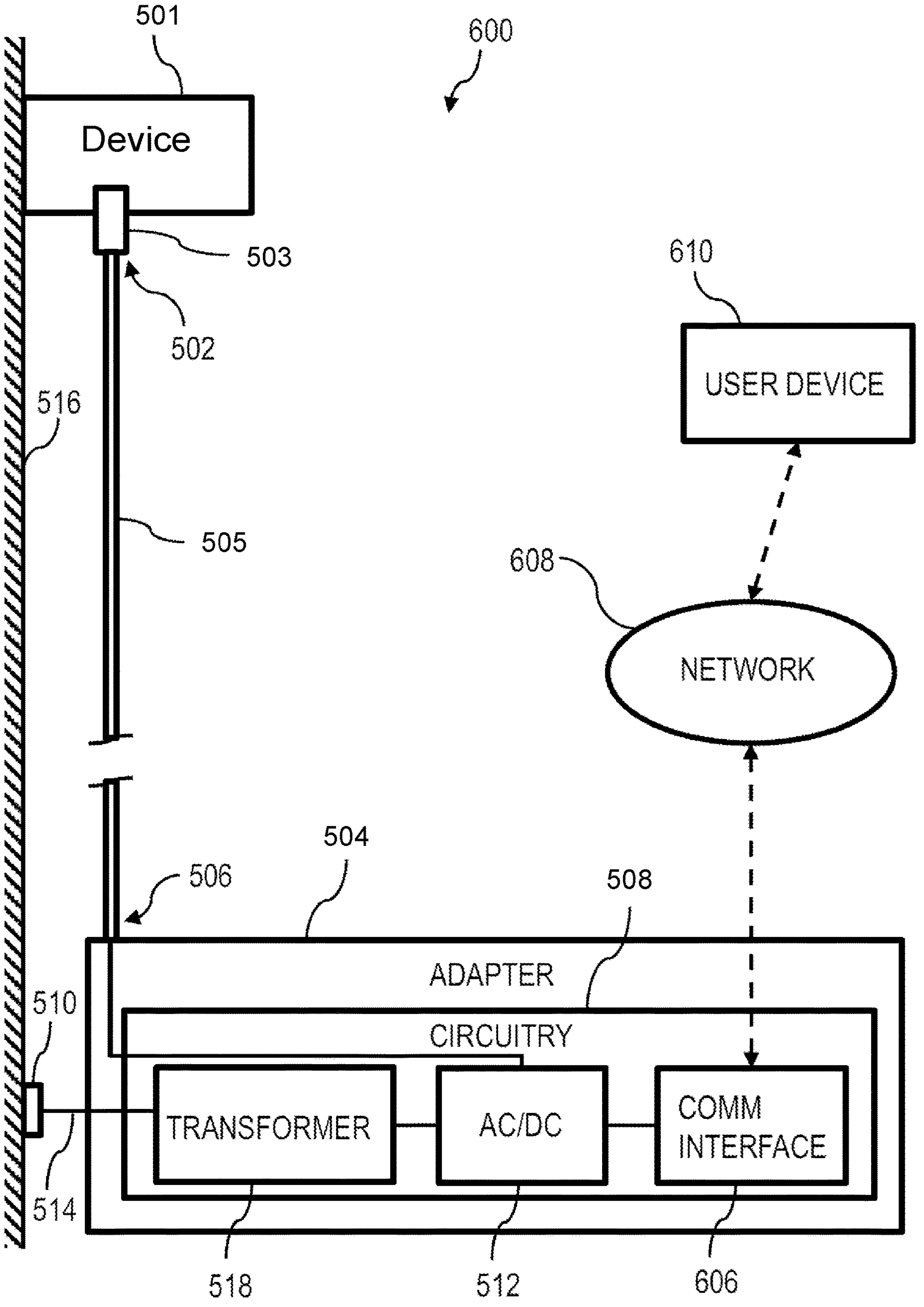
FIG. 6 depicts another example of a system including a device powered over coaxial cable via a power adapter.

FIG. 6 depicts an example of another system 600 including the device 501 powered over the coaxial cable 505 via the power adapter 504. As described above, the device 501 may be the light device 100, which may include the coaxial cable connector 104, light sub-assembly (e.g., 202 of FIGS. 1A-4C), circuitry sub-assembly (e.g., 206 of FIGS. 1A-4C), first connection (e.g., 208 of FIGS. 1A-4C), second connection (e.g., 210 of FIGS. 1A-4C), and, optionally, photosensor (e.g., 222 of FIGS. 1B, 2B-3D, and 4C) and/or motion sensor (e.g., 226 of FIGS. 1B, 2B-3D, and 4C). As shown in FIG. 6, the system 600 includes the coaxial cable 505 coupled to the coaxial cable connector 503 of the device 501 at the first end 502 of the coaxial cable 505.

The system 600 also includes the adapter 504 coupled to the second end 506 of the coaxial cable 505 opposite the first end 502. The adapter 504 includes circuitry 508 capable of converting AC power received from a power source 510 (e.g., grid power) to DC power output to the coaxial cable 505. To that end, the circuitry 508 may include an AC/DC converter 512. The adapter 504 may include an AC power connector 514 configured to be connected to the AC power source 510. The AC power connector 514 may be a pigtail outdoor connector that is weather proof and relatively short in length compared to the coaxial cable 505. As such, the adapter 504 may be located proximate to the AC power source 510 (e.g., located along a side of a building structure 516 to which the device 501 is mounted). As discussed above with reference to FIG. 5, the circuitry 508 in the adapter 504 may include a transformer 518 as well.

As shown in FIG. 6, the circuitry 508 in the adapter 504 may further include a communication interface 606 capable of receiving communications from an external network 608. The circuitry 508 may be capable of controlling an output of DC power to the coaxial cable 505 based on communications received via the communication interface 606.

In certain embodiments, the adapter 504 may be compatible with a smart-home system, such that the adapter 504 (and the attached device 501) act as a smart device for use in a smart-home environment. The smart-home environment may enable communication between smart devices, applications, the Internet, and/or cloud services. Communication may take place over one or more wireless networks 608 (e.g., Wi-Fi network, one or more mesh networks or other local networks) accessible either directly from the communication interface 606 or over a bridge or gateway (e.g., smart-home hub) communicatively coupled to the communication interface 606 and the network 608. The communication interface 606 may be configured to operate according to one or more wireless communication protocols such as, for example, Wi-Fi, Z-wave, Zigbee, Thread, Bluetooth Low Energy (BLE), or Matter. In certain embodiments, the communication interface 606 may be configured to operate according to each of Wi-Fi, BLE, Thread, and Matter to be compatible with various types of smart-home hubs. Since the adapter 504 and the device 501 (e.g., light device 100) are powered via the AC power source 510, as opposed to an onboard battery, the adapter 504 may support communication via any wireless protocol.

The communication interface 606 within the adapter 504 may enable a user to control output of DC power to the coaxial cable (e.g., coaxial cable 200), and thus turn on or off the device 501 (e.g., light device 100), from a remote user device 610 (e.g., cellular telephone, computer, etc.) communicatively coupled to the network 608. The user device 610 may operate a smart-home application that is part of the smart-home system and communicatively coupled through the network 608 to the communication interface 606 of the adapter 504. The adapter 504 may respond to real-time control signals sent from the user device 610 to the communication interface 606. Based on the signals or instructions received from the user device 610, the adapter 504 may perform one or more actions with respect to the device 501. For example, considering the device 501 is the light device 100, the adapter 504 may respond to signals received (over the network 608) from a smart-home hub within the smart-home system to turn the light on or off at particular times based on instructions that were pre-programmed into the smart-home system from a user device 610. As another example, the adapter 504 may respond to signals received from one or more other smart-home devices such as, for example, separate photosensors or motion detection sensors, connected to the network 608 to turn the light on or off in response to detected light conditions or detected motion. Using separate photosensors and/or motion detection sensors connected to the network 608 as separate smart-home devices to control the light device 100 may allow for the light device 100 to be made smaller and less complex, since no sensors need be included in the light device 100.

Since the communication-based control capabilities are provided by the adapter 504 and not the device 501 itself, the device 501 may remain relatively small and easy to mount while being controllable via external communications. In addition, locating the communication interface 606 in the adapter 504 makes the communication interface 606 more easily accessible should repairs be needed.

Figure 7:
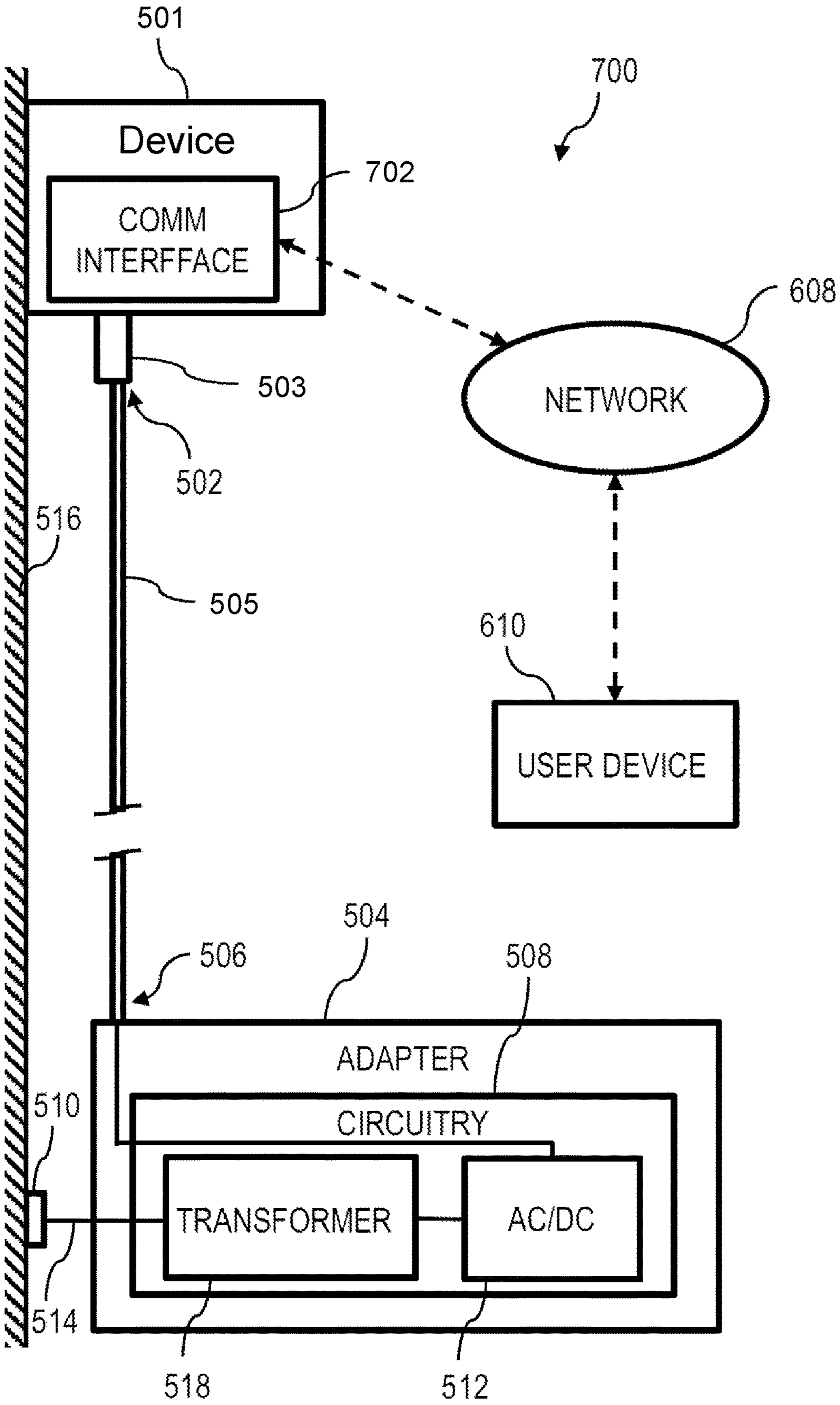
FIG. 7 depicts another example of a system including a device powered over coaxial cable via a power adapter.

FIG. 7 depicts an example of another system 700 including the device 501 powered over the coaxial cable 505 via the adapter 504. As described above, the device 501 may be the light device 100, which may include the coaxial cable connector 104, light sub-assembly (e.g., 202 of FIGS. 1A-4C), circuitry sub-assembly (e.g., 206 of FIGS. 1A-4C), first connection (e.g., 208 of FIGS. 1A-4C), and second connection (e.g., 210 of FIGS. 1A-4C). As shown in FIG. 7, the system 700 includes the coaxial cable 505 coupled to the coaxial cable connector 503 of the device 501 at the first end 502 of the coaxial cable 505.

The system 700 also includes an adapter 504 similar to the one described above with reference to FIGS. 5 and 6. The adapter 504, as illustrated, includes circuitry 508 such as a transformer 518 and AC/DC converter 512, and an AC power connector 514 configured to be connected to the AC power source 510.

As shown in FIG. 7, the device 501 (e.g., circuitry in the light device 100) may further include a communication interface 702 (e.g., communication interface 408 as shown in FIG. 4B), which may be disposed in the housing of the device 501. The communication interface 702 is capable of receiving communications from an external network 608. By way of an example and not limitation, the circuitry in the light device 100 may be capable of controlling a light driver of the light device 100 based on communications received via the communication interface 408 or 702 to control whether the light device 100 is on or off.

In certain embodiments, the device 501 having the communication interface 702 may be compatible with a smart-home system, such that the device 501 acts as a smart device for use in a smart-home environment. Communication may take place over one or more wireless networks 608 (e.g., Wi-Fi network, one or more mesh networks or other local networks) accessible either directly from the communication interface 702 or over a bridge or gateway (e.g., smart-home hub) communicatively coupled to the communication interface 702 and the network 608. The communication interface 702 may be configured to operate according to one or more wireless communication protocols such as, for example, Wi-Fi, Z-wave, Zigbee, Thread, Bluetooth Low Energy (BLE), or Matter. In certain embodiments, the communication interface 702 may be configured to operate according to each of Wi-Fi, BLE, Thread, and Matter to be compatible with various types of smart-home hubs. Since the device 501 is powered via the coaxial cable 505, as opposed to an onboard battery, the device 501 may support communication via any wireless protocol.

The communication interface 702 may enable a user to control output of power to the device 501. For example, considering that the device 501 is the light device 100 and the communication interface 702 is the communication interface 408 as discussed in FIG. 4B, the communication interface 408 within the light device 100 may enable a user to control output of power to the light sub-assembly of the light device 100, and thus turn on or off the light, from a remote user device 610 (e.g., cellular telephone, computer, etc.) communicatively coupled to the network 608. The user device 610 may operate a smart-home application that is part of the smart-home system and communicatively coupled through the network 608 to the communication interface 408 of the light device 100. The light device 100 may respond to real-time control signals sent from the user device 610 to the communication interface 606. The light device 100 may respond to signals received (over the network 608) from a smart-home hub within the smart-home system to turn the light on or off at particular times based on instructions that were pre-programmed into the smart-home system from a user device 610. The light device 100 may respond to signals received from one or more other smart-home devices such as, for example, separate photosensors or motion detection sensors, connected to the network 608 to turn the light on or off in response to detected light conditions or detected motion. Using separate photosensors and/or motion detection sensors connected to the network 608 as separate smart-home devices to control the light device 100 may allow for the light device 100 to be made smaller and less complex, since no sensors need be included in the light device 100.

FIG. 9 shows an example power adapter 504 in accordance with one or more embodiments. As discussed elsewhere herein, the adapter 504 may be used to convert AC to DC power and provide the DC power over a coaxial cable to a device (e.g., light device 100) to power the device. The adapter 504 may include a coaxial cable connector 920, which may be connected or coupled to one end of the coaxial cable (e.g., coaxial cable 200 or 505) to send DC power to the device. The power adapter 504 may include a housing 900 enclosing circuitry 508. Similar to the light device 200, the housing 900 may be made from diecast aluminum and/or may include optional fins 810 to provide heat diffusion and/or dissipation. Alternatively, the housing 900 may be made from any other material, such as polymers, other metals, and/or any other material that provides sufficient heat dissipation and protection to the circuitry 508 in the power adapter 504. The power adapter 504 may include an AC power connector 514 configured to be connected to the external power source 510. The AC power connector 514 may be a standard three or two-prong connector 910 for connecting to an outdoor AC power plug. The AC power connector 514 may be, in one or more other embodiments, hard-wired to the external power source 510 or may take any other form without departing from the disclosure.

Figure 10:
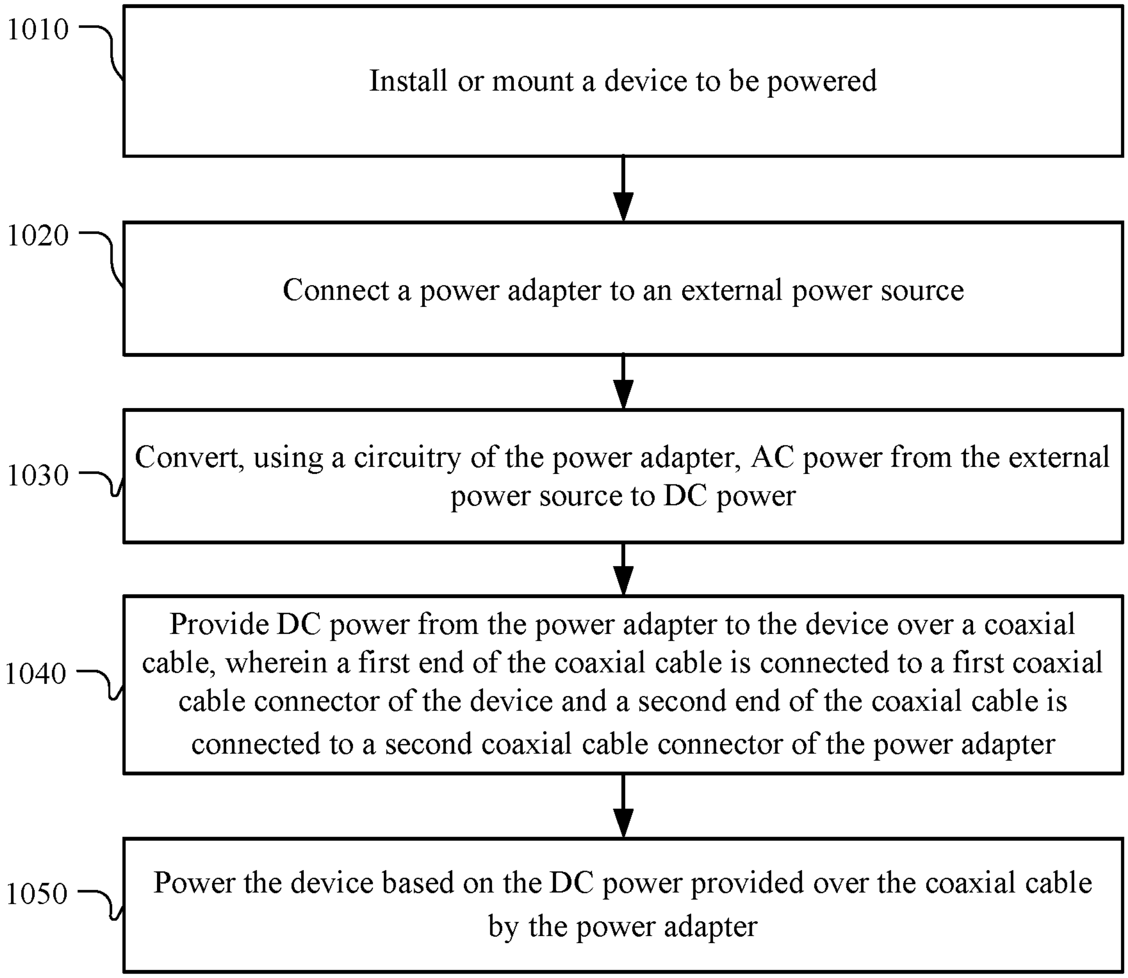
FIG. 10 illustrates an example method for powering a device over a coaxial cable via a power adapter, in accordance with one or more embodiments.

FIG. 10 illustrates an example method 1000 for powering a device over a coaxial cable via a power adapter, in accordance with one or more embodiments. The method 1000 begins at step 1010 by installing or mounting a device that needs to be powered. For example, a light device 100 may be mounted to a structure, such as an outside of a building, via one or more mounting features 111, as discussed in reference to FIGS. 1A-1B, FIGS. 2A-2B, and FIGS. 3A-3D. At step 1020, the method 1000 may connect a power adapter to an external power source. For example, the power adapter 504 may be connected to the AC power source 510 via the AC power connector 514 to receive AC power from the power source 510, as discussed in reference to at least FIG. 5. At step 1030, the method 1000 may convert, using a circuitry of the power adapter, AC power from the external power source to DC power. For example, circuitry 508 of the adapter 504, including transformer 518 and/or the AC/DC converter 512, may be used to convert the AC power received from the AC power source 510 to DC power. At step 1040, the method 1000 may provide the DC power from the power adapter to the device over a coaxial cable. For example, the adapter 504 may provide DC power over the coaxial cable 505 to the device 501, as discussed in reference to at least FIG. 5. In particular embodiments, a first end (e.g., first end 502) of the coaxial cable (e.g., coaxial cable 505) may be connected to a first coaxial connector (e.g., coaxial connector 503 or 104) of the device (e.g., device 501 or 100) and a second end (e.g., second end 506) of the coaxial cable may be connected to a second coaxial connector (e.g., coaxial connector 920) of the power adapter (e.g., adapter 504). At step 1050, the method 1000 may power the device (e.g., light device 100) based on the DC power provided over the coaxial cable by the power adapter. In particular embodiments, a circuitry of the device (e.g., circuitry sub-assembly 206 or the circuitry 216 of the light device 100) may be used to power the device based on the DC power received over the coaxial cable from the power adapter.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for powering a device over a coaxial cable via a power adapter, including the particular steps of the method of FIG. 10, this disclosure contemplates any suitable method for powering a device over a coaxial cable via a power adapter, including any suitable steps, which may include a subset of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Other illustrative embodiments ("Embodiments") are described below:

Embodiment 1: A light device comprising: a housing; a light sub-assembly situated within the housing, the light sub-assembly comprising at least one light-emitting diode (LED); a coaxial cable connector mounted to the housing and having a first end and a second end, the first end being exterior to the housing and connectable to a coaxial cable, the second end being interior to the housing and opposite to the first end; at least one circuitry sub-assembly mounted within the housing and having circuitry mounted thereon, the circuitry capable of receiving DC power from the coaxial cable connector and providing DC power to the light sub-assembly; a first connection within the housing and electrically connecting the light sub-assembly to the at least one circuitry sub-assembly; and a second connection within the housing and electrically connecting the coaxial cable connector to the at least one circuitry sub-assembly.

Embodiment 2: The light device of Embodiment 1, wherein the housing has an overall appearance of being substantially rectangular prism shaped or substantially truncated pyramid shaped.

Embodiment 3: The light device of Embodiment 1, wherein the housing has a rear portion having a substantially rectangular prism shape.

Embodiment 4: The light device of Embodiment 3, wherein the coaxial cable connector is situated in the rear portion.

Embodiment 5: The light device of Embodiment 3, wherein the at least one circuitry sub-assembly is situated in the rear portion.

Embodiment 6: The light device of Embodiment 3, wherein the at least one circuitry sub-assembly is mounted to an interior of the rear portion.

Embodiment 7: The light device of Embodiment 1, wherein the housing has a front portion having a substantially truncated pyramid shape.

Embodiment 8: The light device of Embodiment 7, wherein the light sub-assembly is situated in the front portion.

Embodiment 9: The light device of Embodiment 1, wherein a largest dimension of the housing is less than approximately 15 cm.

Embodiment 10: The light device of Embodiment 1, wherein the coaxial cable connector is one of an F-type, a BNC type, a TNC type, an N-series type, a UHF type, a SMA type, a QMA type, a FME type, a PAL type, a MC type, a MCX type, a MMCX type, a DIN type, a Mini-DIN type, a TS-9 type, or a NMO type.

Embodiment 11: The light device of Embodiment 1, wherein the first end of the coaxial cable connector comprises a female connection portion.

Embodiment 12: The light device of Embodiment 1, further comprising a photosensor, wherein: the photosensor is mounted to the housing and has a portion exposed to an exterior of the housing, the photosensor is connected to the circuitry, and the circuitry is capable of controlling the LED based on a signal received from the photosensor.

Embodiment 13: The light device of Embodiment 1, further comprising a motion sensor, wherein: the motion sensor is mounted to the housing and has a portion exposed to an exterior of the housing, the motion sensor is connected to the circuitry, and the circuitry is capable of controlling the LED based on a signal received from the motion sensor.

Embodiment 14: The light device of Embodiment 1, further comprising: a photosensor; wherein the housing has a rear portion having a substantially rectangular prism shape, the substantially rectangular prism shape having a plurality of faces, the coaxial cable connector passing through a first face of the plurality of faces, the first face having at least one opening, and the photosensor being exposed to an exterior of the housing via the at least one opening of the first face.

Embodiment 15: The light device of Embodiment 1, wherein the light sub-assembly is only powered by the DC power received through the coaxial cable connector.

Embodiment 17: The light device of Embodiment 1, wherein the light sub-assembly comprises only a single LED.

Embodiment 18: The light device of Embodiment 1, wherein the light sub-assembly comprises a single LED or a plurality of LEDs arranged in a configuration occupying an area less than or equal to approximately 1 $cm^2$.

Embodiment 19: The light device of Embodiment 1, wherein there is no transformer present in the housing.

Embodiment 20: The light device of Embodiment 1, wherein the circuitry comprises a communication interface capable of receiving communications from a network, wherein the circuitry is capable of controlling an output of DC power to the light sub-assembly based on communications received via the communication interface.

Embodiment 21: The light device of Embodiment 20, wherein the communication interface is configured to operate according to one or more wireless communication protocols selected from the list consisting of: WiFi, Z-wave, Zigbee, Thread, Bluetooth Low Energy (BLE), and Matter.

Embodiment 22: The light device of Embodiment 20, wherein the light device is compatible with a smart-home system.

Embodiment 23: The light device of Embodiment 1, wherein the light sub-assembly comprises a plurality of LEDs arranged in a configuration occupying an area less than or equal to approximately 20 $cm^2$.

Embodiment 24: The light device of Embodiment 1, further comprising: a photosensor and a motion sensor; wherein the housing has a rear portion having a substantially rectangular prism shape, the substantially rectangular prism shape having a back surface, a first face, a second face, and a third face, the first face located opposite to the second face, the third face connecting the first face and the second face, being substantially perpendicular to the first face, and being substantially perpendicular to the second face, each of the first face, the second face, and the third face being substantially perpendicular to the back surface, and the coaxial cable connector passing through the first face, the first face having at least one opening, and the photosensor and the motion sensor being exposed to an exterior of the housing via the at least one opening of the first face.

Embodiment 25: The light device of Embodiment 1, further comprising: a photosensor and a motion sensor; wherein the housing has a rear portion having a substantially rectangular prism shape, the substantially rectangular prism shape having a back surface, a first face, a second face, and a third face, the first face located opposite to the second face, the third face connecting the first face and the second face, being substantially perpendicular to the first face, and being substantially perpendicular to the second face, each of the first face, the second face, and the third face being substantially perpendicular to the back surface, the coaxial cable connector passing through the first face, the second face having at least one opening, and the photosensor and the motion sensor being exposed to an exterior of the housing via the at least one opening of the second face.

Embodiment 26: The light device of Embodiment 1, further comprising: a photosensor and a motion sensor; wherein the housing has a rear portion having a substantially rectangular prism shape, the substantially rectangular prism shape having a back surface, a first face, a second face, and a third face, the first face located opposite to the second face, the third face connecting the first face and the second face, being substantially perpendicular to the first face, and being substantially perpendicular to the second face, each of the first face, the second face, and the third face being substantially perpendicular to the back surface, the coaxial cable connector passing through the back surface, the first face having at least one opening, and the photosensor and the motion sensor being exposed to an exterior of the housing via the at least one opening of the first face.

Embodiment 27: The light device of Embodiment 1, further comprising: a photosensor and a motion sensor; wherein the housing has a rear portion having a substantially rectangular prism shape, the substantially rectangular prism shape having a back surface, a first face, a second face, and a third face, the first face located opposite to the second face, the third face connecting the first face and the second face, being substantially perpendicular to the first face, and being substantially perpendicular to the second face, each of the first face, the second face, and the third face being substantially perpendicular to the back surface, the coaxial cable connector passing through the first face, the third face having at least one opening, and the photosensor and the motion sensor being exposed to an exterior of the housing via the at least one opening of the third face.

Embodiment 28: A system comprising: a light device comprising: a housing; a light sub-assembly situated within the housing, the light sub-assembly comprising at least one light-emitting diode (LED); a coaxial cable connector mounted to the housing; and circuitry disposed within the housing, the circuitry being capable of receiving DC power from the coaxial cable connector and providing DC power to the light sub-assembly; a coaxial cable coupled to the coaxial cable connector at a first end of the coaxial cable; and an adapter coupled to a second end of the coaxial cable opposite the first end, wherein the adapter comprises circuitry capable of converting AC power received from a power source to DC power output to the coaxial cable.

Embodiment 29: The system of Embodiment 28, wherein the circuitry in the adapter comprises a transformer capable of stepping down voltage of the AC power received from the power source.

Embodiment 30: The system of Embodiment 28, wherein the circuitry of the adapter further comprises a communication interface capable of receiving communications from a network, wherein the circuitry in the adapter is capable of controlling an output of DC power to the coaxial cable based on communications received via the communication interface.

Embodiment 31: The system of Embodiment 30, wherein the adapter is compatible with a smart-home system.

Embodiment 32: The system of Embodiment 30, wherein the communication interface is configured to operate according to one or more wireless communication protocols selected from the list consisting of: WiFi, Z-wave, Zigbee, Thread, Bluetooth Low Energy (BLE), and Matter.

Embodiment 33: The system of Embodiment 28, wherein the coaxial cable is at least 1,000 cm in length.

Embodiment 34: A system comprising: a device to be powered, the device comprising: a first housing, a first coaxial cable connector connected to the first housing, and a first circuitry disposed within the first housing, the first circuitry being capable of receiving DC power from the first coaxial connector and powering the device based on the DC power; a coaxial cable having a first end and a second end opposite the first end, the first end of the coaxial cable being connected or coupled to the first coaxial connector of the device and the second end of the coaxial cable being connected or coupled to a second coaxial connector of a power adapter; and the power adapter for providing the DC power to the device over the coaxial cable, the power adapter comprising: a second housing, the second coaxial cable connector connected to the second housing and coupled to the second end of the coaxial cable, a power connector connected to an external power source to receive AC power, and a second circuitry disposed within the second housing, the second circuitry being capable of converting the AC power received from the external power source to the DC power, wherein the DC power is output, via the second coaxial connector, to the coaxial cable to power the device.

Embodiment 35: The system of Embodiment 34, wherein the device is a light device.

Embodiment 36: The system of Embodiment 35, wherein the light device is capable of outputting light of up to 2000 lumens.

Embodiment 37: The system of Embodiment 34, wherein the first housing or the second housing is made from diecast aluminum.

Embodiment 38: The system of Embodiment 34, wherein the device further comprises fins for heat diffusion.

Embodiment 39: The system of Embodiment 34, wherein the power adapter further comprises fins for heat diffusion.

Embodiment 40: The system of Embodiment 34, wherein the first circuitry of the device comprises a buck converter for adjusting a voltage provided to the device.

Embodiment 41: The system of Embodiment 34, wherein the device is one of: an IP security camera with Wi-Fi and/or smart home features, a miscellaneous home lighting device, a coaxial to USB-C adapter for connecting DC powered products, a wall mounted or floor standing indoor/outdoor fan with coaxial power port, an aroma diffuser with coaxial power port, a solar panel with coaxial power port, batteries with coaxial power ports, a battery charger/pack with coaxial power port, an indoor or outdoor Bluetooth/Wi-Fi speaker powered via coaxial power port, a HD television powered via coaxial power port, a security product or device, a Wi-Fi router or access point, a 5G device, a cellular repeater or a modem, a flush valve sensor, an electronic bathroom valve, an irrigation controller, and an agriculture product.

Embodiment 42: A method comprising: installing or mounting a device to be powered; connecting a power adapter to an external power source; converting, using a circuitry of the power adapter, AC power from the external power source to DC power; providing the DC power from the power adapter to the device over a coaxial cable, wherein a first end of the coaxial cable is connected to a first coaxial cable connector of the device and a second end of the coaxial cable is connected to a second coaxial cable connector of the power adapter; and powering the device based on the DC power provided over the coaxial cable by the power adapter.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A light device comprising:

a housing;

a light sub-assembly situated within the housing, the light sub-assembly comprising at least one light-emitting diode (LED);

a coaxial cable connector mounted to the housing and having a first end and a second end, the first end being exterior to the housing and connectable to a coaxial cable, the second end being interior to the housing and opposite to the first end;

at least one circuitry sub-assembly mounted within the housing and having circuitry mounted thereon, the circuitry being capable of receiving DC power from the coaxial cable connector and providing DC power to the light sub-assembly;

a first connection within the housing and electrically connecting the light sub-assembly to the at least one circuitry sub-assembly; and a second connection within the housing and electrically connecting the coaxial cable connector to the at least one circuitry sub-assembly.

2. The light device of claim 1, wherein the housing has an overall appearance of being substantially rectangular prism shaped or substantially truncated pyramid shaped.

3. The light device of claim 1, wherein the housing has a rear portion having a substantially rectangular prism shape.

4. The light device of claim 3, wherein the coaxial cable connector is situated in the rear portion.

5. The light device of claim 3, wherein the at least one circuitry sub-assembly is situated in the rear portion.

6. The light device of claim 3, wherein the at least one circuitry sub-assembly is mounted to an interior of the rear portion.

7. The light device of claim 1, wherein the housing has a front portion having a substantially truncated pyramid shape.

8. The light device of claim 7, wherein the light sub-assembly is situated in the front portion.

9. The light device of claim 1, wherein a largest dimension of the housing is less than approximately 15 cm.

10. The light device of claim 1, wherein the coaxial cable connector is one of an F-type, a BNC type, a TNC type, an N-series type, a UHF type, a SMA type, a QMA type, a FME type, a PAL type, a MC type, a MCX type, a MMCX type, a DIN type, a Mini-DIN type, a TS-9 type, or a NMO type.

11. The light device of claim 1, wherein the first end of the coaxial cable connector comprises a female connection portion.

12. The light device of claim 1, wherein the light sub-assembly is powered by the DC power received through the coaxial cable connector.

13. The light device of claim 1, wherein the light sub-assembly comprises a single LED.

14. The light device of claim 1, wherein the light sub-assembly comprises a single LED or a plurality of LEDs arranged in a configuration occupying an area less than or equal to approximately 1 $cm^2$.

15. The light device of claim 1, wherein there is no transformer present in the housing.

16. The light device of claim 1, wherein the circuitry comprises a communication interface capable of receiving communications from a network, wherein the circuitry is capable of controlling an output of DC power to the light sub-assembly based on the communications received via the communication interface.

17. The light device of claim 16, wherein the communication interface is configured to operate according to one or more wireless communication protocols selected from the list consisting of: WiFi, Z-wave, Zigbee, Thread, Bluetooth Low Energy (BLE), and Matter.

18. A system comprising:

a light device comprising:

a housing;

a light sub-assembly situated within the housing, the light sub-assembly comprising at least one light-emitting diode (LED);

a coaxial cable connector mounted to the housing; and a first circuitry disposed within the housing, the first circuitry being capable of receiving DC power from the coaxial cable connector and providing DC power to the light sub-assembly;

a coaxial cable coupled to the coaxial cable connector at a first end of the coaxial cable; and an adapter coupled to a second end of the coaxial cable opposite the first end, wherein the adapter comprises a second circuitry capable of converting AC power received from a power source to DC power that is output to the coaxial cable to power the light device.

19. The system of claim 18, wherein the second circuitry in the adapter comprises a transformer capable of stepping down voltage of the AC power received from the power source.

20. The system of claim 18, wherein the second circuitry of the adapter further comprises a communication interface capable of receiving communications from a network, wherein the second circuitry in the adapter is capable of controlling an output of DC power to the coaxial cable based on the communications received via the communication interface.

* * * * *